US009047874B2

(12) United States Patent
Sugiyama

(10) Patent No.: US 9,047,874 B2
(45) Date of Patent: Jun. 2, 2015

(54) NOISE SUPPRESSION METHOD, DEVICE, AND PROGRAM

(75) Inventor: Akihiko Sugiyama, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 987 days.

(21) Appl. No.: 12/530,179

(22) PCT Filed: Mar. 5, 2008

(86) PCT No.: PCT/JP2008/053970

§ 371 (c)(1),
(2), (4) Date: Sep. 4, 2009

(87) PCT Pub. No.: WO2008/111462

PCT Pub. Date: Sep. 18, 2008

(65) Prior Publication Data

US 2010/0014681 A1 Jan. 21, 2010

(30) Foreign Application Priority Data

Mar. 6, 2007 (JP) ................................ 2007-055149

(51) Int. Cl.
*H04B 15/00* (2006.01)
*G10L 21/00* (2013.01)
*G10L 21/0208* (2013.01)

(52) U.S. Cl.
CPC ............. *G10L 21/00* (2013.01); *G10L 21/0208* (2013.01)

(58) Field of Classification Search
CPC ........................... G10L 21/0208; G10L 21/00
USPC .......................................... 381/56, 94.1, 94.2
See application file for complete search history.

(56) References Cited

U.S. PATENT DOCUMENTS

| | | | | |
|---|---|---|---|---|
| 6,301,559 | B1 | 10/2001 | Shinotsuka et al. | |
| 6,910,011 | B1 | 6/2005 | Zakarauskas | |
| 2002/0156623 | A1* | 10/2002 | Yoshida | 704/226 |
| 2004/0057586 | A1* | 3/2004 | Licht | 381/94.7 |
| 2005/0222842 | A1* | 10/2005 | Zakarauskas | 704/233 |

FOREIGN PATENT DOCUMENTS

| | | | | |
|---|---|---|---|---|
| CN | 1530929 | A | | 9/2004 |
| JP | 06-110492 | A | | 4/1994 |
| JP | 06110492 | A | * | 4/1994 |
| JP | 08-022297 | A | | 1/1996 |
| JP | 08022297 | A | * | 1/1996 |
| JP | 11-143485 | A | | 5/1999 |
| JP | 2002-073066 | A | | 3/2002 |
| JP | 2002-204175 | A | | 7/2002 |
| JP | 2003-507764 | A | | 2/2003 |

(Continued)

OTHER PUBLICATIONS

Masanori Kato et al., "A Low-Complexity Noise Suppressor With Nonuniform Subbands and a Frequency-Domain Highpass Filter", Proceedings of ICASSP, May 2006, pp. 473-476, vol. 1.

(Continued)

*Primary Examiner* — Paul S Kim
(74) *Attorney, Agent, or Firm* — Sughrue Mion, PLLC

(57) ABSTRACT

The noise suppression device includes: a shock noise detection unit which receives an input signal including a shock noise and detects a shock noise according to a change of the input signal; and a shock sound suppression unit which receives the shock sound detection result and the input signal so as to suppress the shock sound.

20 Claims, 23 Drawing Sheets

(56) References Cited

FOREIGN PATENT DOCUMENTS

| | | | | |
|---|---|---|---|---|
| JP | 2004-272052 | A | | 9/2004 |
| JP | 2004272052 | A | * | 9/2004 |
| JP | 2006-270591 | A | | 10/2006 |
| JP | 2006270591 | A | * | 10/2006 |

OTHER PUBLICATIONS

Amarnag Subramanya et al., "Automatic Removal of Typed Keystrokes from Speech Signals", Proceedings of ICSLP, Sep. 2006, pp. 261-264.

Yariv Ephraim et al., "Speech Enhancement Using a Minimum Mean-Square Error Short-Time Spectral Amplitude Estimator", IEEE Transactions on Acoustics, Speech, and Signal Processing, Dec. 1984, pp. 1109-1121, vol. 32, No. 6.

Mathematics Dictionary, 324. G page, 1985, Iwanami Shoten, Publishers.

Jae S. Lim et al., "Enhancement and Bandwidth Compression of Noisy Speech", Proceedings of the IEEE, Dec. 1979, pp. 1586-1604, vol. 67, No. 12.

Steven F. Boll, "Suppression of Acoustic Noise in Speech Using Spectral Subtraction", IEEE Transactions on Acoustics, Speech, and Signal Processing, Apr. 1979, pp. 113-120, vol. 27, No. 2.

Chinese Office Action issued in corresponding Chinese Patent Application dated Apr. 25, 2011.

Office Action dated Jun. 26, 2013, issued by the Japanese Patent Office in counterpart Japanese Application No. 2009-503995.

* cited by examiner

NOISE SUPPRESSION METHOD, DEVICE, AND PROGRAM

APPLICABLE FIELD IN THE INDUSTRY

The present invention relates to a noise suppression method and device for suppressing noise superposed upon a desired sound signal, and a program therefor.

BACKGROUND ART

A noise suppressor (noise suppression system), which is a system for suppressing noise superposed upon a desired sound signal, operates, as a rule, so as to suppress the noise coexisting in the desired sound signal by employing an input signal converted in a frequency region, thereby to estimate a power spectrum of a noise component, and subtracting this estimated power spectrum from the input signal. Successively estimating the power spectrum of the noise component enables the noise suppressor to be applied also for the suppression of non-constant noise. There exists, for example, the technique described in Patent document 1 as a noise suppressor.

In addition hereto, there exists the technique described in Non-patent document 1 as a technique realizing a reduction in an arithmetic quantity.

These techniques are identical to each other in a basic operation. That is, the above technique is for converting the input signal into a frequency region with a linear transform, extracting an amplitude component, and calculating a suppression coefficient frequency component by frequency component. Combining a product of the above suppression coefficient and amplitude in each frequency component, and a phase of each frequency component, and subjecting it to an inverse conversion allows a noise-suppressed output to be obtained. At this time, the suppression coefficient is a value ranging from zero to one (1), the output is completely suppressed, namely, the output is zero when the suppression coefficient is zero, and the input is outputted as it stands without suppression when the suppression coefficient is one (1). An estimated value of the noise is employed for calculating the suppression coefficient together with the input signal. There exist various techniques for estimating the noise. For example, the weighted noise estimation technique disclosed in the above-mentioned Patent document can be employed. However, the conventional noise estimation technique including the weighted noise estimation, which involves an averaging operation in one part of its estimation, is not capable of estimating the shock noise such as key typing noise.

On the other hand, the method of suppressing the key typing noise by specializing application for a personal computer and employing press-down information and release information of the key is disclosed in Non-patent document 2. This method is a method of predicting an input signal intensity in a specific region of a time/frequency plane, and determining that the signal is key typing noise when a difference between the obtained prediction value and the actual intensity is large on the assumption that the signal other than the key typing noise does not change drastically in terms of time/frequency. At this moment, so as to enhance a detection precision of the key typing noise, both of the press-down information and the release information of the key are used together.

A configuration of the noise suppressor disclosed in the Non-patent document 2 is shown in FIG. 34. A degraded sound signal (signal in which the desired signal and the shock noise coexist) supplied as a sample value sequence to an input terminal 1 of FIG. 34, which is subjected to the transformation such as a Fourier transform in a conversion unit 2, is divided into a plurality of frequency components, and is supplied to a shock noise detection unit 18 and a shock noise suppression unit 19. The key release information and the key press-down information are supplied to the shock noise detection unit 18 from input terminals 91 and 92, respectively. The shock noise detection unit 18 detects the key typing noise by employing a difference between the predicted value and the actual value of the input signal intensity in the specific region of the time/frequency plane. At first, the shock noise detection unit 18 calculates amplitude of the current frame with a linear prediction using the amplitude of the just-before frame and the frames before it. Continuously, it calculates a sound likelihood that is founded upon a difference between the predicted amplitude and the actual amplitude. When the key press-down information or the key release information is conveyed from the input terminal 92 or the input terminal 91, the shock noise detection unit 18 defines an existence probability of the shock noise in the frame of which the sound likelihood is smallest, out of a plurality of the frames existing before and after the current frame, to be 1. The shock noise detection unit 18 defines the existence probability of the shock noise in the frames other than it, and the frames to which the key press-down information or the key release information has not notified to be 0 (zero). The existence probability of the shock noise is supplied to the shock noise suppression unit 19.

The shock noise suppression unit 19 calculates the amplitude for the frame of which the existence probability of the shock noise is 1 with a statistical technique by employing the amplitude of the just-before frame and the just-after frame, and outputs it as amplitude of the emphasized sound. By locally performing the calculation of the averaging and the dispersion for s statistical model being used, and adaptably controlling these values, a precision of the estimated amplitude can be improved. The specific calculation procedure is disclosed in the Non-patent document 2, so its explanation is omitted. Nothing is done for the frame of which the shock noise existence probability is 0, and the amplitude of the inputted degraded-sound is conveyed as amplitude of the emphasized sound as it stands to an inverse conversion unit 3. The inverse conversion unit 3 inverse-converts the power spectrum of the shock noise suppression sound supplied from the shock noise suppression unit 19, and the phase of the degraded sound supplied from the conversion unit 2 in all, and supplies it to an output terminal 4 as an emphasized sound signal sample.

Patent document 1: JP-P2002-204175A

Non-patent document 1: PROCEEDINGS OF ICASSP, Vol. 1, pp. 473 to 476, May, 2006

Non-patent document 2: PROCEEDINGS OF ICSLP, pp. 261 to 264, September, 2006

DISCLOSURE OF THE INVENTION

Problems to be Solved by the Invention

With the configuration disclosed in the Patent document 1 and the Non-patent document 1, which involves an averaging operation for estimating the noise that should be suppressed, it is impossible to follow in the wake of the shock noise such as the key typing noise. For this, the above configuration causes a problem that the shock noise such as the key typing noise cannot be suppressed. Further, the method disclosed in the Non-patent document 2 causes a problem that shock noise occurrence information such as the pressing-down/the releasing of the key is required for accomplishing the shock noise detection with a sufficient precision.

Thereupon, the present invention has been accomplished in consideration of the above-mentioned problems, and an object thereof is to provide a noise suppression method, device, and program that make it possible to suppress the shock noise without using the shock noise occurrence information, and to output the emphasized sound with a high sound quality.

Means to Solve the Problem

With the Noise suppression method, the Device, and the Program, the present inventions detect the shock noise based on a change in the input signal and suppress the shock noise in case of the detection.

The present invention for solving the above-mentioned problems is a noise suppression method, comprising: converting an input signal into a frequency region signal; obtaining information as to whether or not shock noise exists by employing a changed quantity of the above frequency region signal; and suppressing the shock noise by employing the above information as to whether or not the shock noise exists and said frequency region signal.

The present invention for solving the above-mentioned problems is a noise suppression device, comprising: a conversion unit for converting an input signal into a frequency region signal; a shock noise detection unit for obtaining information as to whether or not shock noise exists by employing a changed quantity of the above frequency region signal; and a shock noise suppression unit for suppressing the shock noise by employing the above information as to whether or not the shock noise exists and said frequency region signal.

The present invention for solving the above-mentioned problems is a noise suppression program causing a computer to execute the processes of: converting an input signal into a frequency region signal; obtaining information as to whether or not sound exists by employing the above frequency region signal: obtaining information as to whether or not shock noise exists by employing the above information as to whether or not the sound exists, and a changed quantity and a flatness degree of said frequency region signal; obtaining an estimated value of the shock noise by employing said information as to whether or not the sound exists, said information as to whether or not the shock noise exists, and said frequency region signal; and suppressing the shock noise by employing the above estimated value of the shock noise and said frequency region signal, thereby to generate an emphasized sound.

An Advantageous Effect of the Invention

With the present invention, the shock noise is detected based upon a change in the input signal.

For this, it becomes possible to suppress the shock noise without using the shock noise occurrence information, and the emphasized sound with a high sound quality can be outputted.

DESCRIPTION OF NUMERALS

Figure 1:
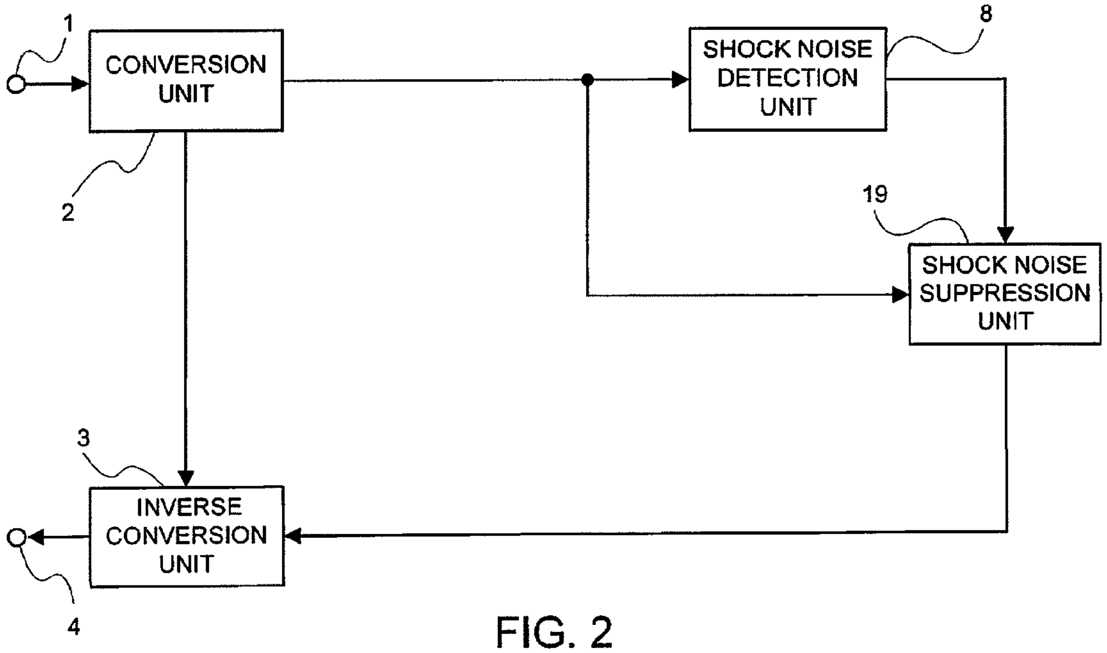
FIG. 1 is a block diagram illustrating the best mode of the present invention.

1, 91 and 92 input terminals
2 conversion unit
3 inverse conversion unit
4 output terminal
5, 16, 660, 3203, 6204, 6205, 6901, 6903, and 6507 multipliers
6, 450, 6208, 6902, and 6904 adders
7 and 17 non-shock noise suppression units
8, 10, 18, and 20 shock noise detection units
9 sound detection unit
11 shock noise estimation unit
12 subtracter
13 smoothing unit
14 random number generation unit
15 suppression coefficient calculation unit
19 shock noise suppression unit
21 frame division unit
22 and 32 windowing process units
23 Fourier transform unit
31 frame synthesis unit
33 inverse Fourier transform unit
81 changed quantity calculation unit
82, 83, 102 and 103 probability calculation units
84 flatness degree calculation unit
111 non-shock noise learning unit
112 shock noise learning unit
113 memory
114 shock noise estimation unit for non-sound
115 shock noise estimation unit for sound
116 and 117 mixture units
300 noise estimation unit
310 estimated noise calculation unit
320 weighted degraded-sound calculation unit
330 and 480 counters
400 update determination unit
410 register length storage unit
420 and 3201 estimated noise storage units
430 and 6505 switches
440 shift register
460 minimum value selection unit
470 division unit
600 and 601 noise suppression coefficient generation units
610 acquired SNR calculation unit
620 estimated inherent-SNR calculation unit
630 noise suppression coefficient calculation unit
640 sound non-existence probability storage unit
650 and 651 suppression coefficient amendment units
670 sound existence probability calculation unit
680 temporary output SNR calculation unit
1000 computer
3202 by-frequency SNR calculation unit
3204 non-linear process unit
4001 logic sum calculation unit
4002, 4004, and 6504 comparison units
4003, 4005, and 6503 threshold storage units
4006 threshold calculation unit
6201 value range restriction processing unit
6202 acquired SNR storage unit
6203 suppression coefficient storage unit
6206 weight storage unit
6207 weighted addition unit
6301 MMSE STSA gain function value calculation unit
6302 generalized likelihood ratio calculation unit
6303 suppression coefficient calculation unit
6501 maximum value selection unit
6502 suppression coefficient lower-limit value storage unit
6506 correction value storage unit
6511 maximum value selection unit
6512 suppression coefficient lower-limit value calculation unit
6905 constant multiplier

BEST MODE FOR CARRYING OUT THE INVENTION

Figure 34:
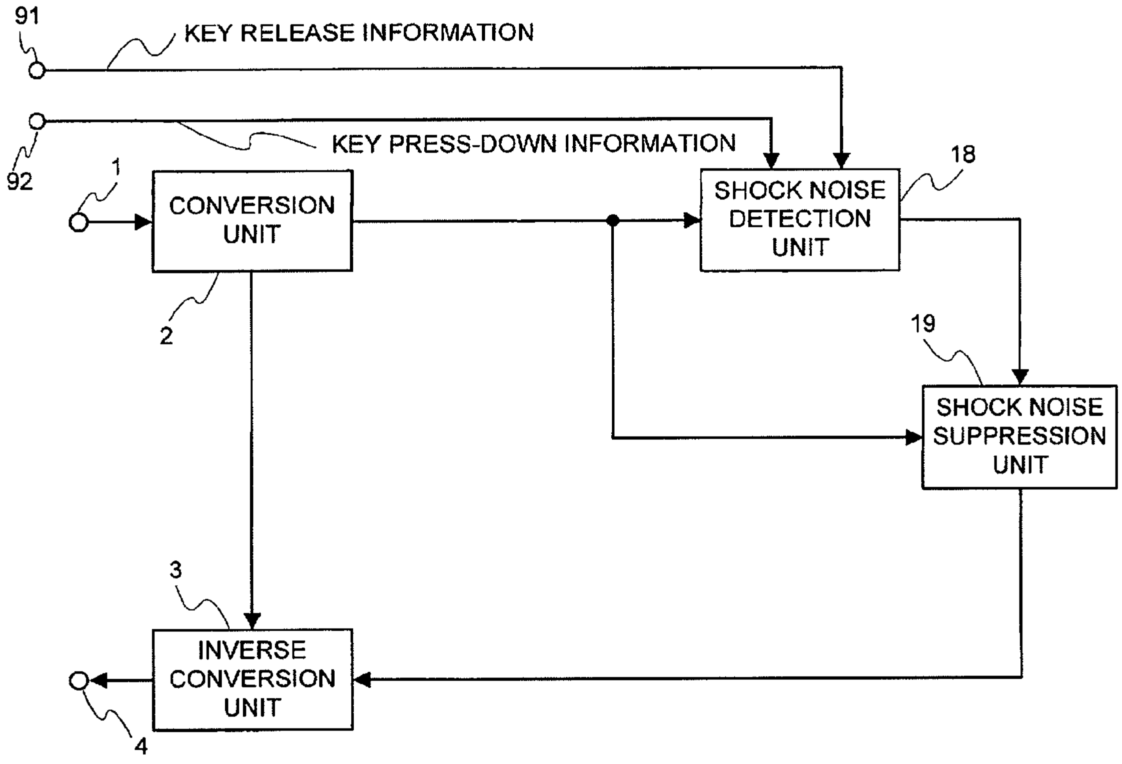
FIG. 34 is a block diagram illustrating a configuration of the conventional noise suppression device.

FIG. 1 is a block diagram illustrating the best mode of the present invention. A point in which FIG. 1 differs from FIG. 34, being the conventional example, is that the shock noise detection unit 18 has been replaced with a shock noise detection unit 8, and the key release information and the key pressing-down information supplied to shock noise detection unit 18 are not supplied to the shock noise detection unit 8.

The degraded sound supplied to an input terminal 1 is subjected to the transformation such as a Fourier transform in a conversion unit 2, is divided into a plurality of frequency components, and is supplied to the shock noise detection unit 8 and a shock noise suppression unit 19. The phase is conveyed to an inverse conversion unit 3. The shock noise detection unit 8 detects the shock noise based upon a change in the input signal spectrum, and conveys the detected signal to the shock noise suppression unit 19. The shock noise suppression unit 19 conveys to the inverse conversion unit 3 the signal recovered with an MAP estimation technique when the shock noise has been detected, and the degraded sound itself in the case other than the foregoing. The inverse conversion unit 3 inverse-converts the power spectrum of the shock noise suppression sound supplied from the shock noise suppression unit 19, and the phase of the degraded sound supplied from the conversion unit 2 in all, and conveys it to an output terminal 4 as an emphasized sound signal sample. Instead of the power spectrum, the amplitude value as well equivalent to the square root thereof can be employed.

Figure 2:
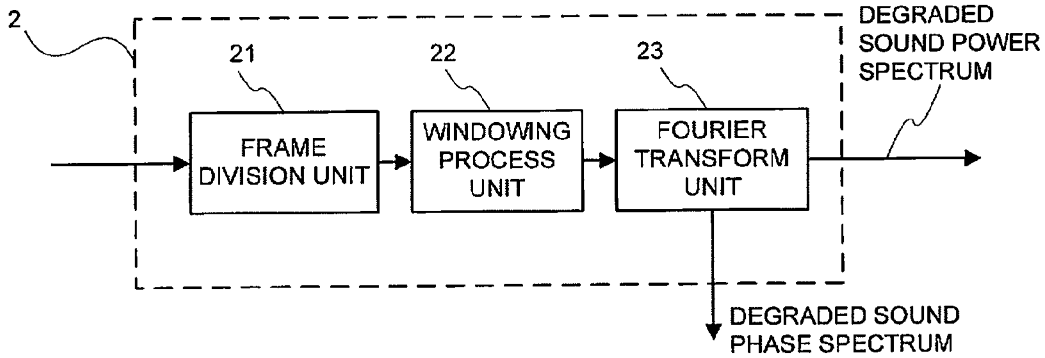
FIG. 2 is a block diagram illustrating a configuration of a conversion unit being included in FIG. 1.

FIG. 2 is a block diagram illustrating a configuration example of the conversion unit 2. The conversion unit 2 is configured of a frame division unit 21, a windowing process unit 22, and a Fourier transform unit 23. A degraded sound signal sample is supplied to the frame division unit 21, and is divided into frames for each K/2 samples. Where, it is assumed that K is an even number. The degraded sound signal sample divided into the frames is supplied to the windowing process unit 22, and is multiplied by a window function w(t). A signal $y_n(t)$-bar that is obtained by windowing an input signal $y_n(t)$ (t=0, 1, . . . , K/2-1) of an n-th frame with w(t) is given by the following equation.

$$\bar{y}_n(t)=w(t)y_n(t) \quad \text{[Numerical equation 1]}$$

Further, it is also widely conducted to partially superpose (overlap) the continuous two frames upon each other for windowing. When it is assumed that an overlapping length is 50% of the frame length, $y_n(t)$-bar (t=0, 1, . . . , K−1), which is obtained with respect to t=0, 1, . . . , K/2-1 by the following equation, becomes an output of the windowing process unit 22.

$$\bar{y}_n(t)=w(t)y_{n-1}(t+K/2)$$

$$\bar{y}_n(t+K/2)=w(t+K/2)y_n(t) \quad \text{[Numerical equation 2]}$$

A symmetric window function is employed for a real-number signal. Further, the window function is designed so that the input signal at the time of having set the suppression coefficient to one (1) coincides with the output signal except for a calculation error. This means that w(t)+w(t+K/2)=1 is yielded.

From now on, the explanation is continued with the case of overlapping 50% of the continuous two frames upon each other for windowing taken as an example. As w(t), for example, a Hanning window shown in the following equation can be employed.

$$w(t)=\begin{cases} 0.5+0.5\cos\left(\frac{\pi(t-K/2)}{K/2}\right), & 0\le t<K \\ 0, & \text{otherwise} \end{cases} \quad \text{[Numerical equation 3]}$$

Besides this, various window functions such as a Humming window, a Kaiser window, and a Blackman window are known. The windowed output $y_n$(t)-bar is supplied to the Fourier transform unit 23, and is converted into a degraded sound spectrum $Y_n$(k). The degraded sound spectrum $Y_n$(k) is separated into a phase spectrum and an amplitude spectrum, a degraded sound phase spectrum arg $Y_n$(k) is supplied to the inverse conversion unit 3, and a degraded sound power spectrum $|Y_n(k)|^2$ to a multiplier 5, a noise estimation unit 300, and a noise suppression coefficient generation unit 601.

Figure 3:
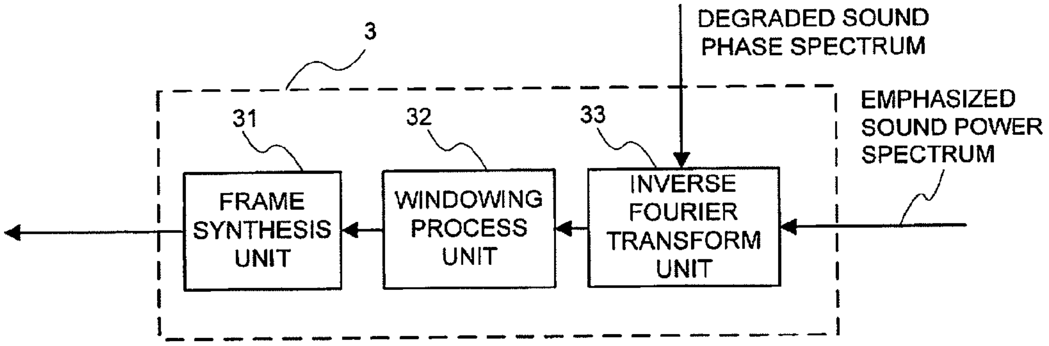
FIG. 3 is a block diagram illustrating a configuration of an inverse conversion unit being included in FIG. 1.

FIG. 3 is a block diagram illustrating a configuration example of the inverse conversion unit 3. The inverse conversion unit 3 is configured of an inverse Fourier transform unit 33, a windowing process unit 32, and a frame synthesis unit 31. The inverse Fourier transform unit 33 multiplies an emphasized sound amplitude spectrum $|X_n(k)|$-bar obtained by employing an emphasized sound power spectrum $|X_n(k)|^2$-bar supplied from the multiplier 5 by the degraded sound phase spectrum arg $Y_n$(k) supplied from the conversion unit 2, thereby to obtain an emphasized sound $X_n$(k)-bar. That is, the inverse Fourier transform unit 33 executes the following equation.

$$\bar{X}_n(k)=|\bar{X}_n(k)|\cdot\arg Y_n(k) \quad \text{[Numerical equation 4]}$$

The obtained emphasized sound $X_n$(k)-bar is subjected to the inverse Fourier transform, is supplied to the windowing process unit 32 as a time region sample value sequence $x_n$(t)-bar (t=0, 1, . . . , K−1) of which one frame is configured of K samples, and is multiplied by the window function w(t). A signal $x_n$(t)-bar obtained by windowing an input signal $x_n$(t) (t=0, 1, . . . , K/2-1) of an n-th frame with w(t) is given by the following equation.

$$\bar{x}_n(t)=w(t)x_n(t) \quad \text{[Numerical equation 5]}$$

Further, it is also widely conducted to partially superpose (overlap) the continuous two frames upon each other for windowing. When it is assumed that the overlapping length is 50% of the frame length, $y_n$(t)-bar (t=0, 1, . . . , K−1) that is obtained with respect t=0, 1, . . . , K/2-1 by the following equation becomes an output of the windowing process unit 32, and is conveyed to the frame synthesis unit 31.

$$\bar{x}_n(t)=w(t)x_{n-1}(t+K/2)$$

$$\bar{x}_n(t+K/2)=w(t+K/2)x_n(t) \quad \text{[Numerical equation 6]}$$

The frame synthesis unit 31 takes out K/2 samples from each of the neighboring two frames of $x_n$(t)-bar, and superposes them upon each other, and obtains an emphasized sound $x_n$(t)-hat by the following equation.

$$\hat{x}_n(t)=\bar{x}_{n-1}(t+K/2)+\bar{x}_n(t) \quad \text{[Numerical equation 7]}$$

The obtained emphasized-sound $x_n$(t)-hat (t=0, 1, . . . , K−1) is conveyed as an output of the frame synthesis unit 31 to the output terminal 4. While the explanation was made in FIG. 2 and FIG. 3 on the assumption that the transformation being applied in the conversion unit and the inverse conversion unit was the Fourier transform, it is widely known that other transformation such as a cosine transform, a Hadamard transform, a Haar transform, and a wavelet transform can be employed instead of the Fourier transform. In addition, the conversion unit 2 and the inverse conversion unit 3 can be configured of a filter bank that forms a pair. The reason is that the input signal can be frequency-analyzed with the filter bank as well. It is widely known that while utilizing the filter bank causes a frequency resolution to decline as a rule, a time resolution is enhanced, and the filter bank is utilized more suitably for application that aims for reducing a delay time of an entire process.

Figure 4:
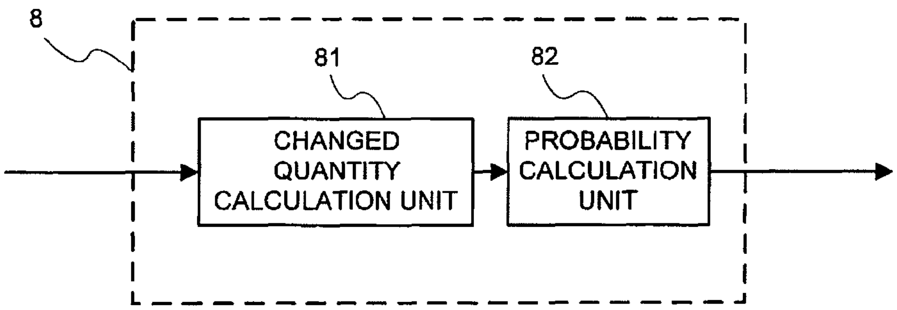
FIG. 4 is a block diagram illustrating a configuration of a shock noise detection unit being included in FIG. 1.

FIG. 4 is a block diagram illustrating a configuration example of the shock noise detection unit 8 being included in FIG. 1. The shock noise detection unit 8 is configured of a changed quantity calculation unit 81 and a probability calculation unit 82. The degraded sound power spectrum supplied to the shock noise detection unit 8 is conveyed to the changed quantity calculation unit 81. The changed quantity calculation unit 81 detects a rapid increase in the degraded sound power spectrum due to existence of the shock noise. The detection of a rapid increase is carried out by calculating a changed quantity of the degraded sound power spectrum, and comparing this changed quantity with a pre-decided threshold. A difference of the power spectrum between the current frame and the past frame in each frequency component can be employed as a changed quantity. This difference could be a difference with the value of the just-before frame, and could be a difference with the value of the frame that is ahead of the current frame by the plural frames. Further, a difference between the minimum value and the maximum value obtained from plural values of the frames, which are ahead of the current frame by plural frames, can be employed. The difference of the power spectrum obtained in such a manner is conveyed to the probability calculation unit 82.

Additionally, prior to these operations, the degraded sound power spectrum can be also averaged in a frequency direction. As one example, for each frequency component, a frequency component neighboring the above frequency component in a higher direction and a frequency component neighboring the above frequency component in a lower direction, and the above frequency component are employed at a ratio of 25%, 25% and 50%, respectively, thereby to calculate a new above frequency component. There is an effect of reducing an inadequate dispersion of the power spectrum along the frequency axis, and emphasizing a change in the time axis direction. Further, the degraded sound power spectra of adequately-divided frequency bands can be employed instead of individually performing the process for each frequency. The number of the targets for which a changed quantity is calculated is decrease, which contributes to a reduction in the arithmetic quantity.

The probability calculation unit 82 calculates a probability that the shock noise exists, based upon a changed portion in the degraded sound power spectrum supplied from the changed quantity calculation unit 81. In the most general way, the probability can be defined to be 1 when the foregoing changed portion exceeds a pre-decided threshold, and to be a ratio of a changed portion and a threshold when the foregoing changed portion does not reach a pre-decided threshold. It is also possible to calculate the probability with an arbitrary function of the foregoing changed portion and threshold, and it is also possible to quantize the probability, thereby to define it to be an output. A special example of such a quantization is a binary quantization, and the output is 1 or 0, i.e. whether or not the shock noise exists. The probability obtained in such manner becomes an output of the probability calculation unit 82, that is, an output of the shock noise detection unit 8. Additionally, with the detection of the shock noise, all of the frequency components are not targeted, but one part of the frequency component may be targeted. For example, it is difficult to differentiate the sound from the shock noise when the sound starts rapidly because the spectrum power of the sound is strong in a low band. In such a case, detecting the shock noise only with a high-band frequency makes it possible to avoid an erroneous detection caused by the sound.

Figure 5:
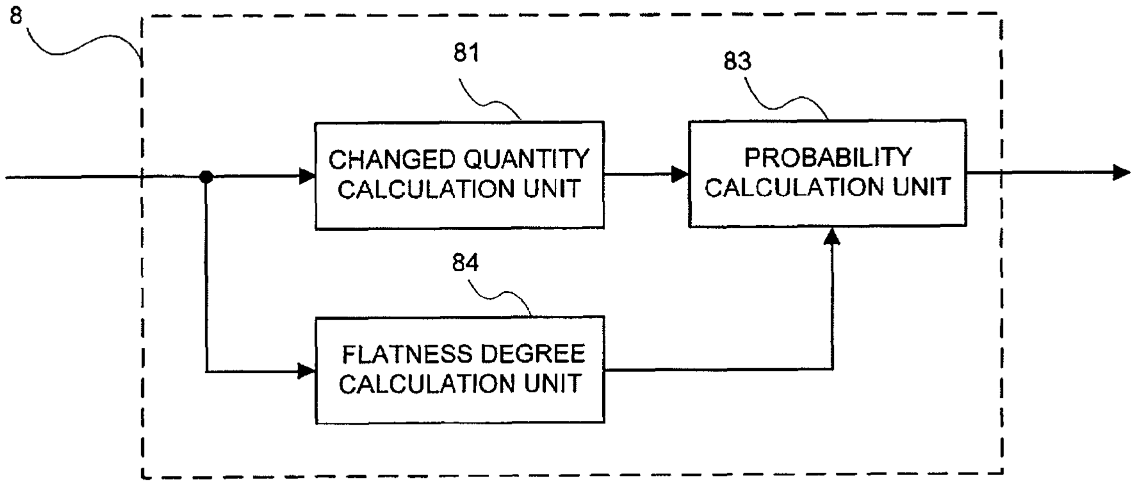
FIG. 5 is a block diagram illustrating a second configuration of the shock noise detection unit being included in FIG. 1.

FIG. 5 is a block diagram of a second configuration example of the shock noise detection unit 8 being included in FIG. 1. A comparison of it with FIG. 4 illustrating the first configuration example demonstrates that the probability calculation unit 82 has been replaced with a probability calculation unit 83, and a flatness degree calculation unit 84 has been newly added. The degraded sound being supplied to the shock noise detection unit 8 is supplied to the flatness degree calculation unit 84 as well simultaneously with the changed quantity calculation unit 81. The flatness degree calculation unit 84 calculates a dispersion of each frequency component in the identical frame, and supplies its result to the probability calculation unit 83 as a flatness degree. This utilizes the fact that that the shock noise spectra widely exist in a wide-range frequency band. The shock noise rapidly increases in its amplitude for a short time, whereby inevitably, the high-frequency component is relatively numerous. Thus, the frequency power spectrum of the shock noise becomes flat as compared with that of the signal having a high stationarity. As an example of the flatness degree, a difference between the maximum value and the minimum value of the degraded sound power spectrum can be listed. The calculation of a difference between the maximum value and the minimum value can be also performed with a limit to a specific frequency range put. In particular, the sound is strong in the low-band power spectrum, whereby obtaining a difference between the maximum value and the minimum value in all bands causes an erroneous detection to increase. Performing the calculation of a difference between the maximum value and the minimum value in the frequency bands except the frequency band in which the sound spectrum is strong makes it possible to raise a detection precision of the shock noise. In addition, the flatness degrees calculated in a plurality of the different bands can be also combined. As one example, the flatness degree based upon a ratio of the power spectra in a high band and a middle/low band, and a ratio of the mutual power spectra in a middle/low band can be combined. While the former is large with the case of the sound, it is small with the case other than it. While the latter is small with the case of fricative noise, it is large with the case other than it. Combining and employing these makes it possible to differentiate the shock noise from a fricative noise starting point, which is susceptible to the erroneous detection. Additionally, the averaging of the flatness degrees in the frequency direction, and the grouping thereof into a plurality of the frequency bands are applicable in the calculation of the flatness degree similarly to the case of calculating the changed quantity already explained.

The probability calculation unit 83 having received the changed quantity and the flatness degree of the degraded sound power spectrum calculates a shock noise existence probability by employing these. The changed quantity in a specific frequency band and the flatness degree in a specific band can be combined and employed in the probability calculation. These frequency bands may coincide with each other completely, and may coincided partially. Further, the power spectrum as well of the completely different band can be employed. As a rule, while the probability is taken as high when the changed quantity is large, the probability is modified to a low level when the flatness degree is extremely high. This is founded on the fact that the fricative noise is susceptible to the erroneous detection when a changed quantity is large. In addition, it is also possible to combine identification of the shock noise and the fricative noise starting point using a plurality of the flatness degrees already explained, thereby to calculate the probability. An operation other than this is one already explained in the probability calculation unit 82. The calculated shock noise existence probability becomes an output of the probability calculation unit 83, that is, an output of the shock noise detection unit 8.

Figure 6:
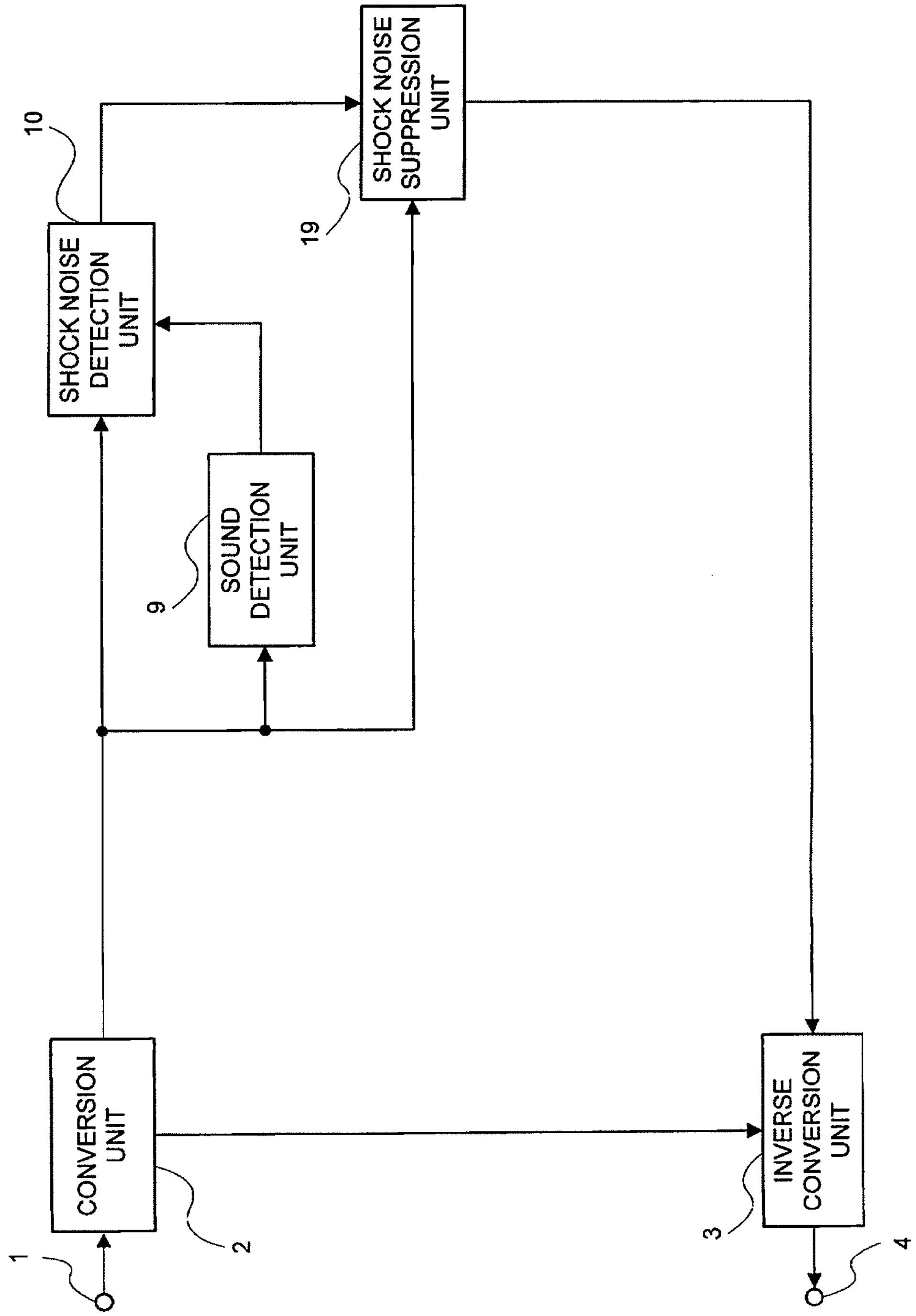
FIG. 6 is a block diagram illustrating a second embodiment of the present invention.

FIG. 6 is a block diagram illustrating a second embodiment of the present invention. A point in which FIG. 6 differs from FIG. 1, being the best mode, is that the shock noise detection unit 8 has been replaced with a shock noise detection unit 10, and a sound detection unit 9 has been added. The sound detection unit 9, upon receipt of the degraded sound power spectrum, outputs the sound existence probability. The sound existence probability can be decided based upon a dispersion of the power spectrum intensities along the frequency axis. When this dispersion is small, the sound existence probability is set to a small level, and when this dispersion is large, the sound existence probability is set to a large level. The probability can be defined to be 1 when the dispersion is larger than a pre-decided threshold, and to be a ratio of the dispersion and the threshold when it is equal to or less than the threshold. Further, the foregoing probability can be also calculated by employing a ratio of the power spectra of the low band and the high band. The probability can be defined to be 1 when this ratio is larger than a pre-decided threshold, and to be a ratio of this ratio and the threshold when it is equal to or less than the threshold. In addition, the foregoing probability can be also calculated by employing an increase rate of the power spectrum. For example, the power spectrum of the sound is strong in the low band. Thus, an increase rate of the power spectrum in the low band is evaluated, and the probability can be defined to be 1 when this increase rate is larger than a pre-decided threshold, and to be a ratio of this increase rate and the threshold when it is equal to or less than the threshold. That is, instead of recovering the desired signal based upon the sound likelihood, the shock noise estimation unit 11 estimates the power spectrum of the shock noise, and the subtracter 12 subtracts the estimated value, thereby allowing the desired signal of which the shock noise has been suppressed to be gained. So as to estimate the power spectrum of the shock noise, the shock noise detection result, the sound detection result, and the degraded sound power spectrum are supplied to the shock noise estimation unit 11 from the shock noise detection unit 10, the sound detection unit 9, and the conversion unit 2, respectively.

Figure 9:
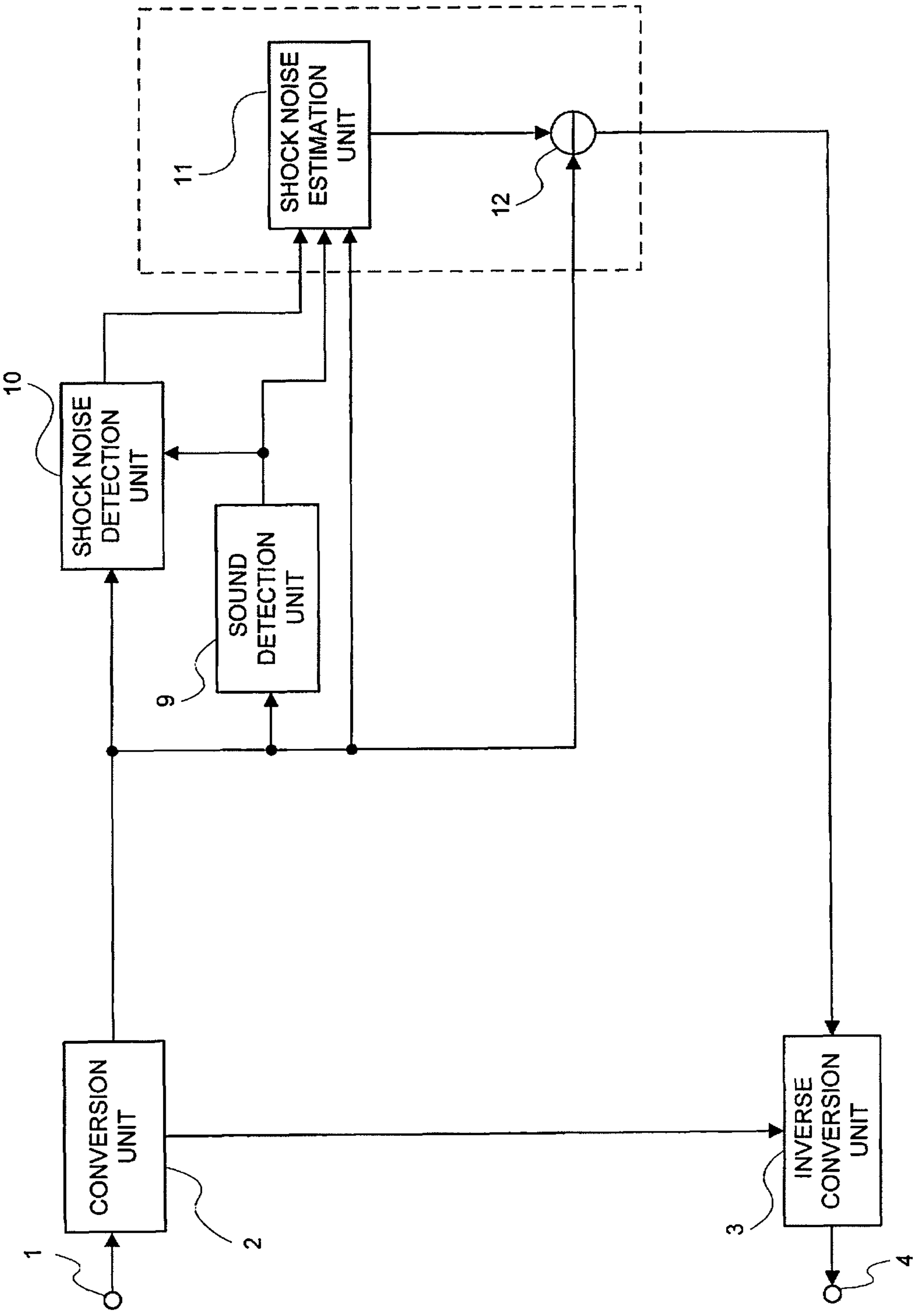
FIG. 9 is a block diagram illustrating a third embodiment of the present invention.
Figure 10:
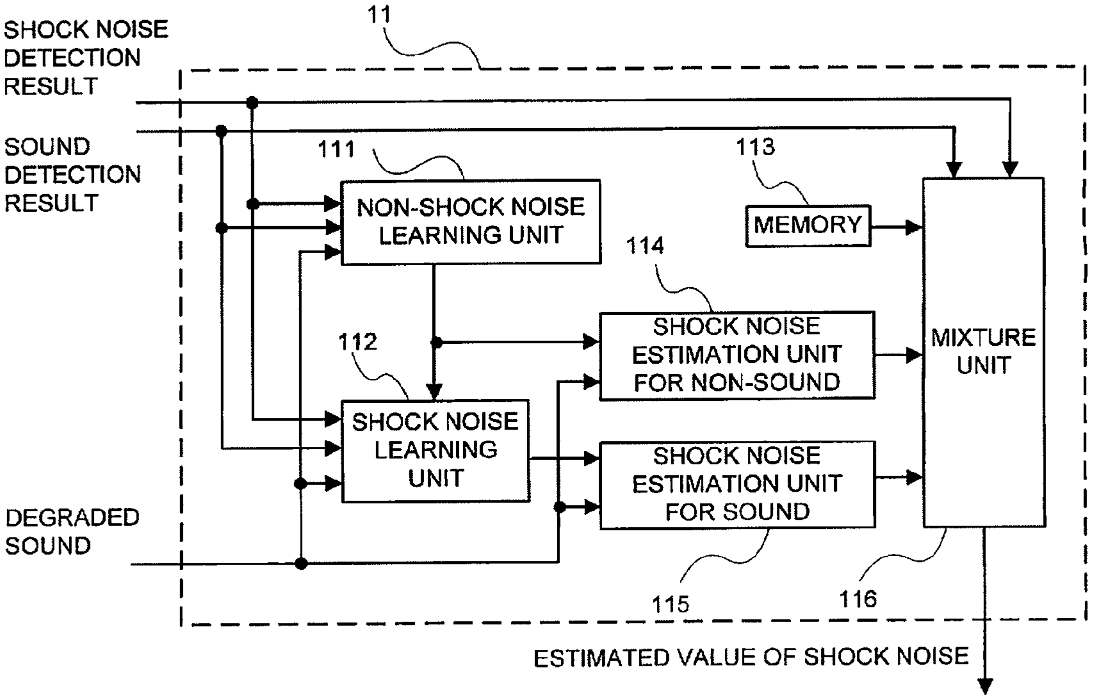
FIG. 10 is a block diagram illustrating a configuration of a shock noise estimation unit being included in FIG. 9.

FIG. 10 is a block diagram illustrating a configuration example of the shock noise estimation unit 11 being included in FIG. 9. The shock noise estimation unit 11 is configured of a non-shock noise learning unit 111, a shock noise learning unit 112, a memory 113, a shock noise calculation unit 114 for non-sound, a shock noise calculation unit 115 for sound, and a mixture unit 116. The shock noise detection result, the sound detection result, and the degraded sound power spectrum are supplied to the non-shock noise learning unit 111. When both of the sound detection result and the shock noise detection result exhibit a low probability, the non-shock noise learning unit 111 learns the non-shock noise by employing the degraded sound spectrum. As a simplest example, the probability can be defined to be 1 when the increase rate is larger than a pre-decided threshold, and to be a ratio of the increase rate and the threshold when it is equal to or less than the threshold. It is also possible to adequately combine these indexes and to define its result to be a sound existence probability. Further, it is also possible to quantize the gained probability, thereby to define it to be an output. The method of quantizing the probability into two values of 0 and 1 is a simplest quantization example. The obtained sound existence probability is conveyed to the shock noise detection unit 10.

Figure 7:
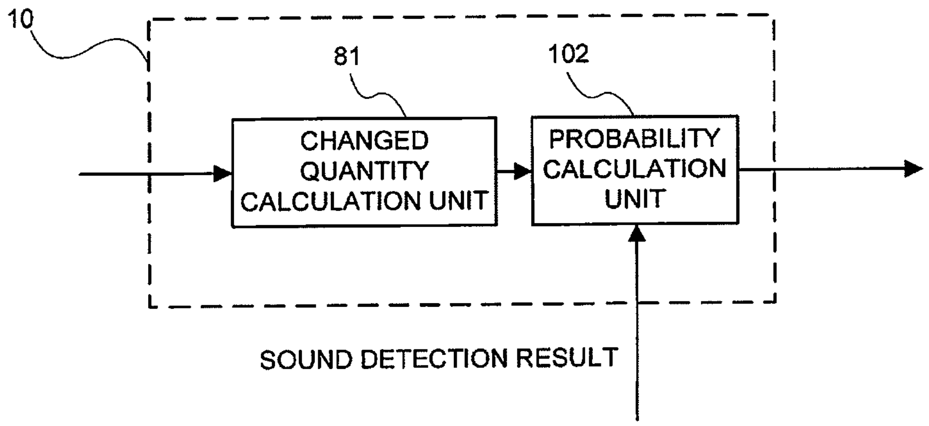
FIG. 7 is a block diagram illustrating a configuration of the shock noise detection unit being included in FIG. 6.

FIG. 7 is a block diagram illustrating a configuration example of the shock noise detection unit 10 being included in FIG. 6. A difference with the shock noise detection unit 8 explained by employing FIG. 4 is that the probability calculation unit 82 has been replaced with a probability calculation unit 102. For example, the value of a parameter being employed at the moment of calculating the probability based upon the changed quantity can be adequately changed. There is the case that the sound abruptly increases in its power spectrum also when no shock noise exists, and so as to prevent this from being erroneously detected as a shock noise, the detection threshold is desirably made large when the sound detection result indicates a large sound likelihood. Further, likewise, when the sound likelihood is large, it is also possible to exclude the frequency band in which the power spectrum of the sound is large from the probability calculation in some cases, and to weaken a contribution thereof to the probability calculation. An operation other than this is one already explained by employing the shock noise detection unit 8.

Figure 8:
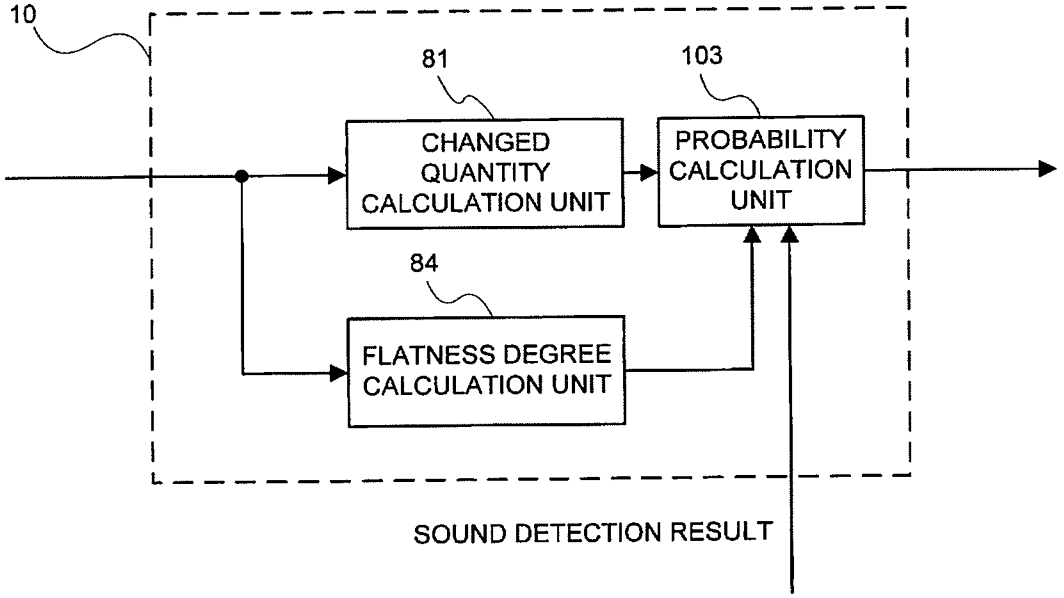
FIG. 8 is a block diagram illustrating a second configuration of the shock noise detection unit being included in FIG. 6.

FIG. 8 is a block diagram illustrating a second configuration example of the shock noise detection unit 10 being included in FIG. 6. A comparison of it with FIG. 5 illustrating the second configuration example of the shock noise detection unit 8 in the best mode demonstrates that it differs in a point that the probability calculation unit 83 has been replaced with a probability calculation unit 103. A difference between an operation of the probability calculation unit 83 in FIG. 5 and an operation of the probability calculation unit 103 in FIG. 8 is identical to a difference between an operation of the probability calculation unit 82 and an operation of the probability calculation unit 102 already explained by employing FIG. 7, so its details are omitted.

FIG. 9 is a block diagram illustrating a third embodiment of the present invention. A point in which FIG. 9 differs from FIG. 6, being the second embodiment, is that the shock noise suppression unit 19 has been replaced with a shock noise estimation unit 11 and a subtracter 12, and when the condition is met, an average value of the degraded sound spectra is updated, and the gained newest average value is defined to be learned non-shock noise. At the moment of obtaining the average, the moving averaging technique of averaging the newest constant samples at any time, the leaky integration technique of mixing the average value so far and the newest momentary value at a certain ratio, or the like can be utilized. The learned non-shock noise is conveyed as artificial non-shock noise to the shock noise learning unit 112 and the shock noise estimation unit 114 for non-sound.

The shock noise detection result, the sound detection result, the degraded sound power spectrum, and the artificial non-shock noise are supplied to the shock noise learning unit 112. The learning of the shock noise is performed when the sound detection result exhibits a low probability, and the shock noise detection result exhibits a high probability. While the method of learning the shock noise is basically identical to that of the case of the non-shock noise, it differs in a point of employing a difference between the degraded sound power spectrum and the supplied artificial non-shock noise instead of the degraded sound power spectrum. Employing the above difference enables an influence of the non-shock noise upon the learned shock noise to be avoided. The learned shock noise is conveyed as artificial shock noise to the shock noise estimation unit 115 for sound.

The learning of the non-shock noise and shock noise may be performed for each frequency component, and may be performed for a group in which a plurality of the frequency components have been collected. While performing the learning for the frequency component group causes the frequency resolution in the power spectrum of the artificial non-shock noise to decline, the necessary arithmetic quantity can be curtailed. It is also possible to apply the averaging for a plurality of the neighboring frequency components prior to the learning. Further, it is also possible to adjust and employ magnitude of the power spectrum being employed for the learning or the like responding to the probability that controls the learning. As an example thereof, the technique of, when the probability indicative of the sound detection result is not low sufficiently, performing the averaging operation by employing one part of the degraded sound power spectrum can be listed. In addition, it is also possible to normalize the power spectrum being employed for the learning or the like. For example, the current degraded sound power spectrum can be normalized by the average power spectrum of the foregoing frequency component group or the average power spectrum in all bands. Applying the normalization enables the learning of the shock noise that is not susceptible to an influence by the input signal power.

The shock noise estimation unit 114 for non-sound, upon receipt of the artificial non-shock noise and the degraded sound power spectrum, generates the artificial shock noise for a situation where no sound exists and only shock noise exists. In a situation where no sound exists and only shock noise exists, the current degraded sound is replaced with the degraded sound for a situation where neither the sound nor the shock noise exists, and outputted. So as to realize this replacement by use of the subtraction being later described, the shock noise estimation unit 114 for non-sound obtains a difference between the current degraded sound and the non-shock noise, and conveys it as artificial shock noise for non-sound to the mixture unit 116. When the foregoing normalization has been applied by the non-shock noise learning unit 111 and the shock noise learning unit 112, the shock noise estimation unit 114 for non-sound obtains the non-shock noise by performing the inverse normalization corresponding hereto, and conveys a difference between the degraded sound and the inverse-normalized non-shock noise as artificial shock noise for non-sound to the mixture unit 16.

The shock noise estimation unit 115 for sound, upon receipt of the artificial shock noise and the degraded sound power spectrum, generates the artificial shock noise for a situation where both of the sound and the shock noise exist. So as to reduce a distortion of the power spectrum of the desire sound, the shock noise estimation unit 115 for sound analyzes the degraded sound power spectrum, the shock noise detection result, the sound detection result, or the like, and obtains a dispersion of the spectra, a probability of the fricative noise, a continuity of the process of suppressing the shock noise, or the like. The various amendments, for example, the adjustment of a suppression degree of the shock noise suppression, and the application of the suppression degree that differs for each frequency component can be carried out responding to these analysis results. The shock noise estimation unit 115 for sound applies the amendment process having such a purpose for the artificial shock noise, and thereafter, conveys it as artificial shock noise for sound to the mixture unit 116. When the foregoing normalization has been applied by the non-shock noise learning unit 111 and the shock noise learning unit 112, the shock noise estimation unit 115 for sound applies an inverse normalization identical to the inverse normalization that the shock noise estimation unit 114 for non-sound has applied.

The mixture unit 116 receives a zero signal from the memory 113 in addition to the foregoing artificial shock noise for non-sound and artificial shock noise for sound, and outputs an estimated value of the shock noise. In addition, the shock noise detection result and the sound detection result are supplied to the mixture unit 116 for control. The mixture unit 116 adequately mixes the zero, the artificial shock noise for non-sound, and the artificial shock noise for sound responding to the existence probabilities of the shock noise and the sound, and outputs it as an estimated value of the shock noise. While the various mixing methods can be applied for the estimated value of the shock noise, the mixture unit 116 basically mixes the component corresponding to a high existence probability at a high ratio. Further, the simplest mixing method is a method in which the mixture unit 116 acts as a selection unit. The artificial shock noise for sound, the artificial shock noise for non-sound, and the zero are selected and outputted as an estimated value of the shock noise when both of the sound existence probability and the shock noise existence probability are high, when the sound existence probability is low and the shock noise existence probability is high, and when both of the sound existence probability and the shock noise existence probability are low, respectively.

In FIG. 10, one example of an output $N^2(t)$-hat of the mixture unit 116 when the existence probability of the shock noise is expressed with three values of 0, 1, and 2, and the existence probability of the sound is expressed with two values of 0 and 1 is as follows.

$$\hat{N}^2(t) = \begin{cases} |Y_n(k)|^2 - \overline{U}_n^2(k) & D_n = 2,\ \overline{V}_n = 0 \\ a_n\overline{T}_n^2(k) & D_n = 2,\ \overline{V}_n = 1 \\ ra_n\overline{T}_n^2(k) & D_n = 1,\ \overline{V}_n = 1 \\ 0 & D_n = 0,\ \overline{V}_n = 1 \end{cases} \qquad \text{[Numerical equation 8]}$$

Where, $|Y_n(k)|^2$ is the degraded sound power spectrum, $U_N^2(k)$-bar is the normalized estimated value of the non-shock noise, $T_N(k)$-bar is the normalized estimated value of the shock noise, a is the amendment coefficient for equalizing the power of the shock noise suppression signal to that of the just-before frame, and r is the amendment coefficient of $0 \le r \le 1$ that is employed when the shock noise existence probability is at a middle level or so.

Figure 11:
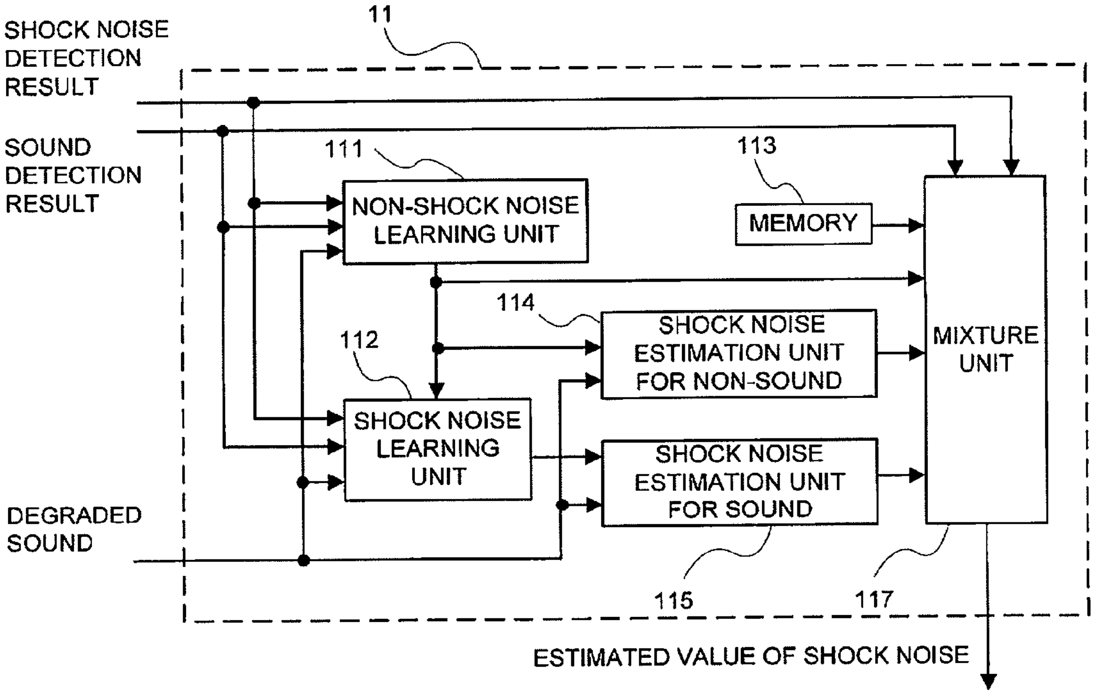
FIG. 11 is a block diagram illustrating a second configuration of the shock noise estimation unit being included in FIG. 9.

FIG. 11 is a block diagram illustrating a second configuration example of the shock noise estimation unit 11 being included in FIG. 9. A comparison of it with FIG. 10 illustrating the first configuration example demonstrates that it differs in a point that the mixture unit 116 has been replaced with a mixture unit 117. The artificial non-shock noise is furthermore supplied to the mixture unit 117 in addition to an input signal identical to the input signal supplied to the mixture unit 116. While the mixture unit 116 mixes the zero, the artificial shock noise for non-sound, and the artificial shock noise for sound, the mixture unit 117 mixes the artificial non-shock noise as well, and outputs it as an estimated value of the shock noise. The mixing of the artificial non-shock noise can be controlled with various items of information. As one example, when the existence probabilities of both of the shock noise and the sound are low, the artificial non-shock noise can be employed instead of the zero signal coming from the memory. Making a configuration in such a manner enables the non-shock noise to be suppressed when a probability that not only the sound but also the shock noise exists is low.

Figure 12:
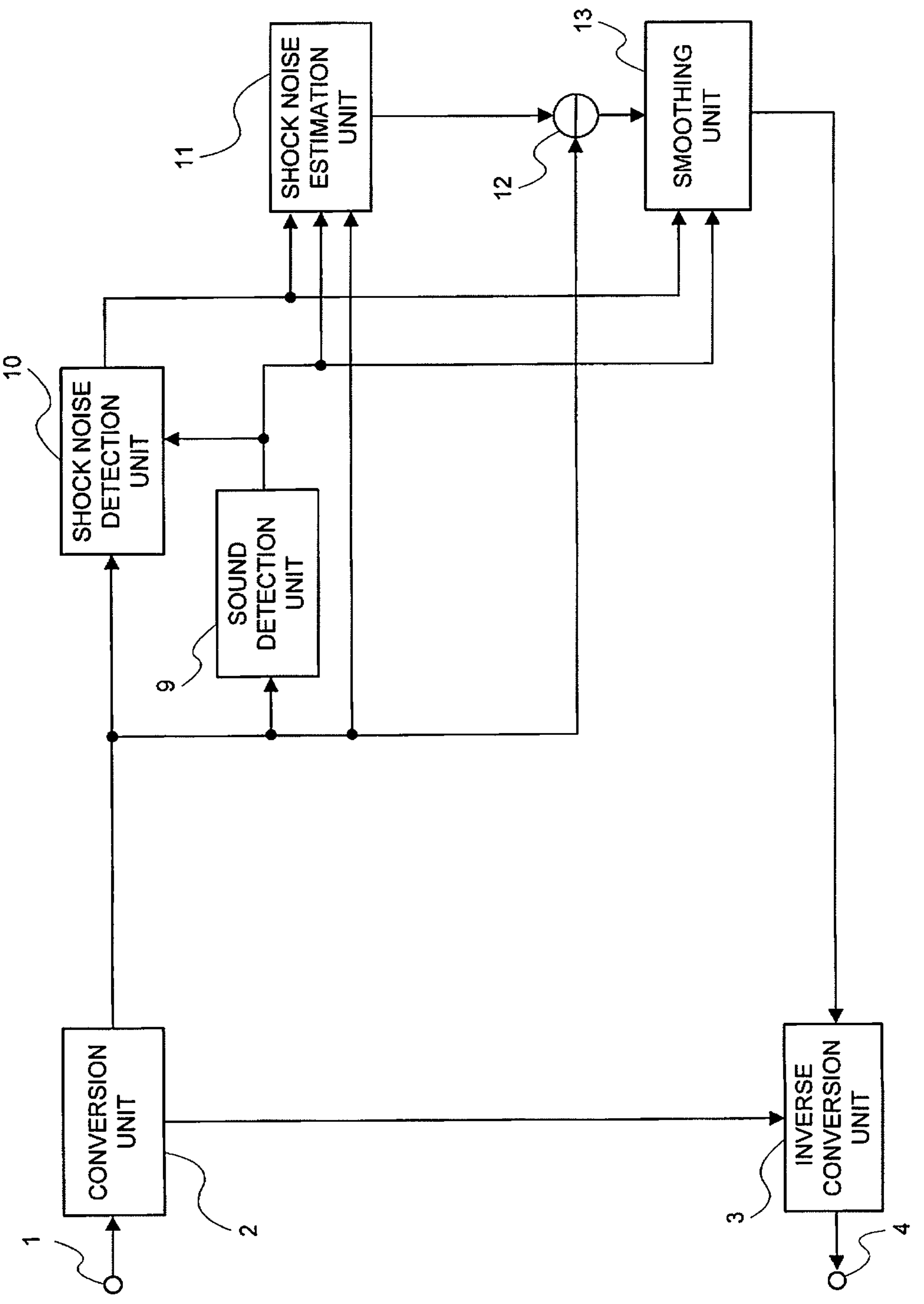
FIG. 12 is a block diagram illustrating a fourth embodiment of the present invention.

FIG. 12 is a block diagram illustrating a fourth embodiment of the present invention. A point in which FIG. 12 differs from FIG. 9, being the third embodiment, is that a smoothing unit 13 has been added. The smoothing unit 13 smoothes an output of the subtracter 12, being a signal of which the shock noise has been suppressed. The shock noise detection result and the sound detection result are furthermore supplied to the smoothing unit 13 from the shock noise detection unit 10 and the sound detection unit 9, respectively. Employing these items of the information enables the timing at which the smoothing is performed to be controlled. For example, the control such that the smoothing is carried out only when the probability indicative of the shock noise detection result is high, and the smoothing is avoided only when the probability indicative of the sound detection result is high is possible. In addition, it is possible to change a time constant of the smoothing in some cases, and to change the frequency band for which the smoothing is applied in some cases, based upon these items of the information. With these adaptive controls, more natural shock noise suppression result can be gained.

Figure 13:
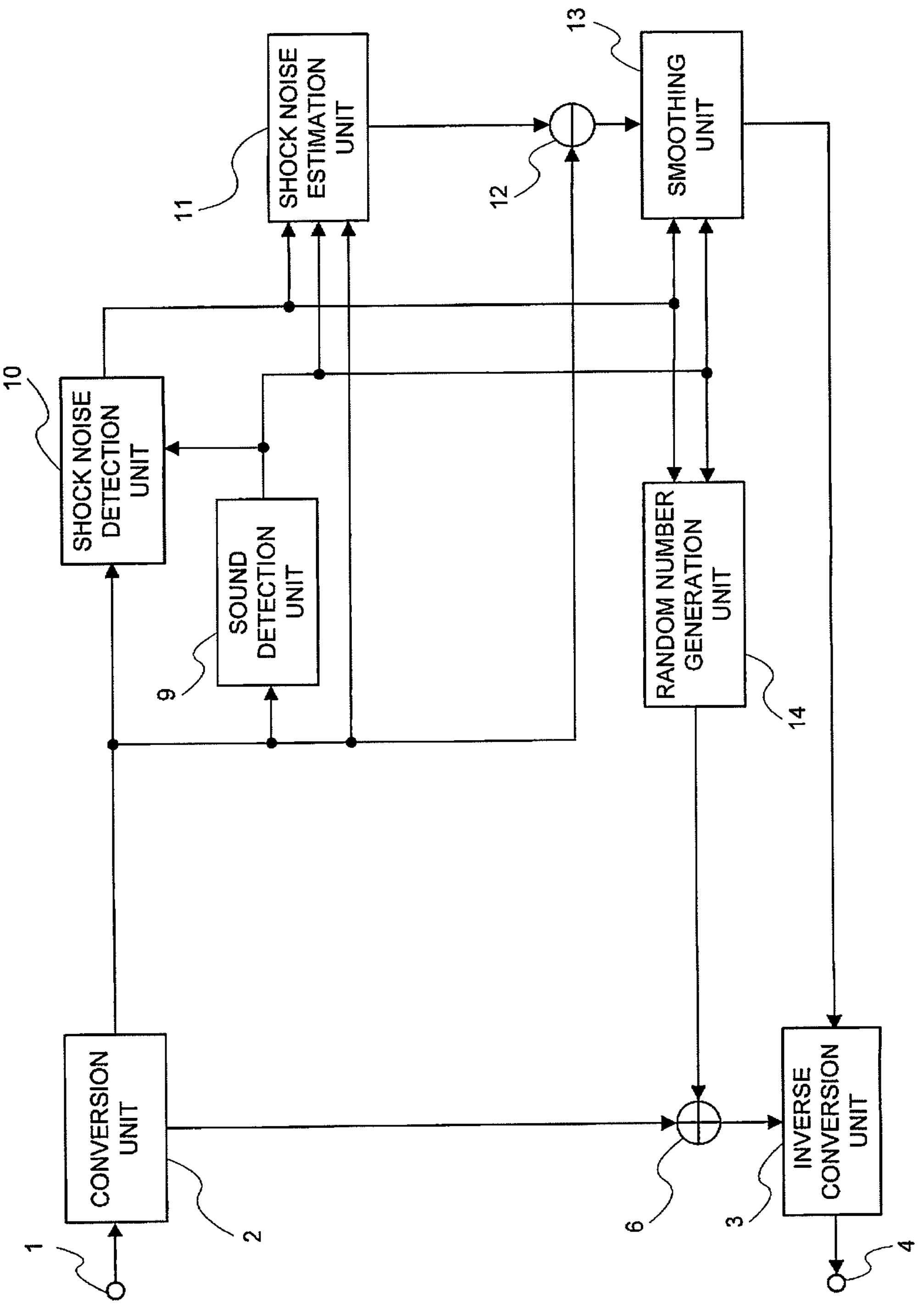
FIG. 13 is a block diagram illustrating a fifth embodiment of the present invention.

FIG. 13 is a block diagram illustrating a fifth embodiment of the present invention. A point in which FIG. 13 differs from FIG. 12, being the fourth embodiment, is that a random number generation unit 14 and an adder 6 have been added. The random number generation unit 14 generates a random number, and conveys it to the adder 6. The adder 6 adds the random number received from the random number generation unit 14 to phase information received from the conversion unit 2, and conveys an addition result to the inverse conversion unit 3. The shock noise detection result and the sound detection result are furthermore supplied to the random number generation unit 14. The random number generation unit 14 can control a timing at which the random number is generated, and a value band of the random number by employing these items of the information. For example, it can generate the random number only when the probability indicative of the shock noise detection result is high. Performing the operation in such a manner allows the phase information to be changed only when the shock noise suppression is performed, thereby enabling the shock noise suppression result, which is more natural, to be gained. Further, the value region of the random number being generated can be also controlled with the sound detection result and the shock noise detection result. Narrowing the value region of the random number when the probability indicative of the sound detection result is high enables a distortion of the sound to be made small.

Figure 14:
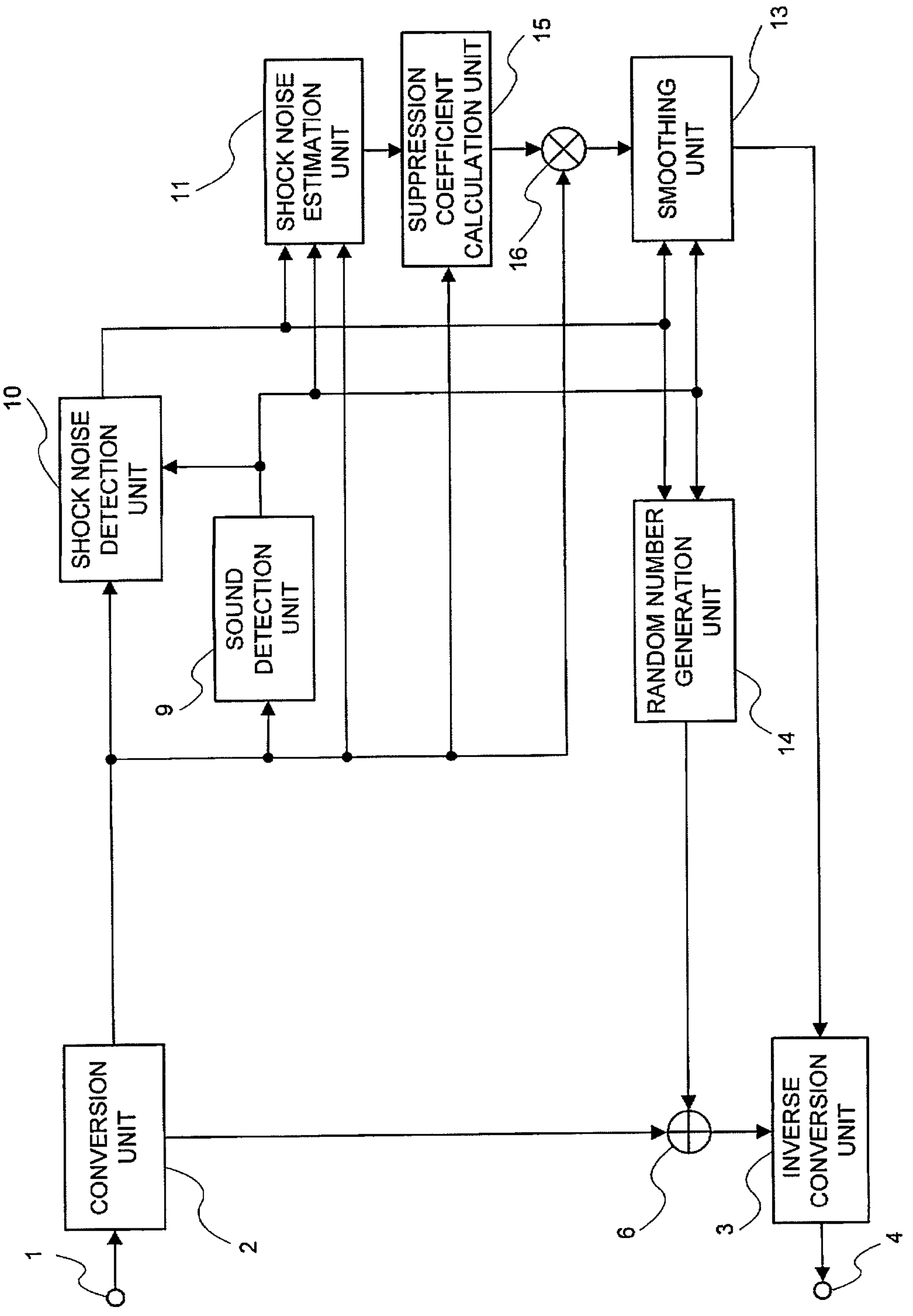
FIG. 14 is a block diagram illustrating a sixth embodiment of the present invention.

FIG. 14 is a block diagram illustrating a sixth embodiment of the present invention. A point in which FIG. 14 differs from FIG. 13, being the fifth embodiment, is that the subtracter 12 has been replaced with a suppression coefficient calculation unit 15 and a multiplier 16. The suppression coefficient calculation unit 15 and the multiplier 16 realize the shock noise suppression, which is yielded by multiplying a suppression coefficient having a value of 0 to 1, instead of realizing the shock noise suppression with subtraction. The method of calculating the suppression coefficient, which is known most widely, is a minimum mean square error (MMSE) method of minimizing a mean square error of the residual signal after suppression. For the minimum mean square error method, a reference to the Patent document 1 or the like can be made. The suppression coefficient calculation unit 15, upon receipt of the estimated value of the shock noise from the shock noise estimation unit 11, and the degraded sound power spectrum from the conversion unit 2, calculates the suppression coefficient, and supplies it to the multiplier 16. The multiplier 16, to which the degraded sound power spectrum and the suppression coefficient have been supplied, supplies a product thereof, being a multiplication result, as a shock noise suppression signal to the smoothing unit 13.

Figure 15:
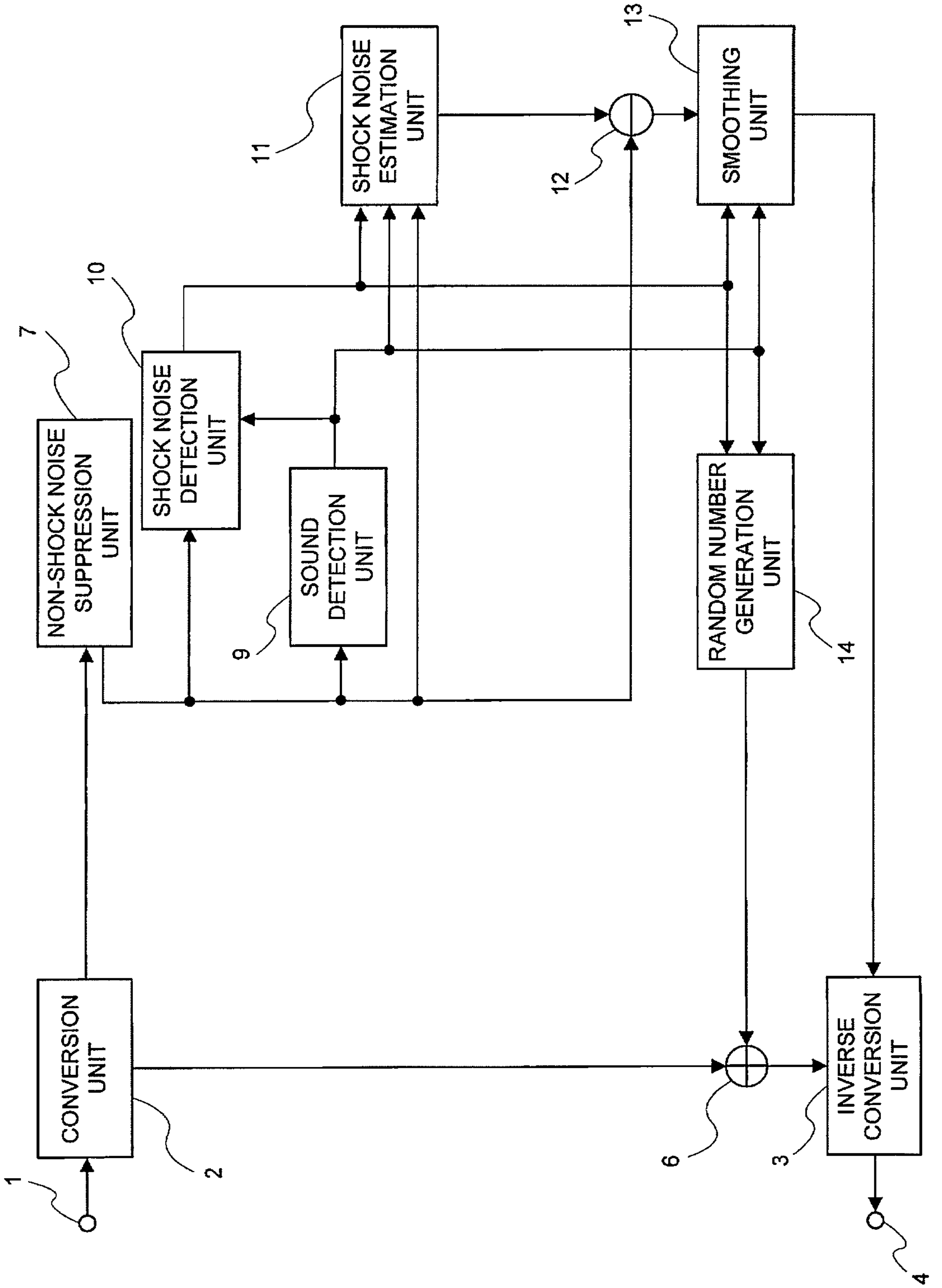
FIG. 15 is a block diagram illustrating a seventh embodiment of the present invention.

FIG. 15 is a block diagram illustrating a seventh embodiment of the present invention. A point in which FIG. 15 differs from FIG. 14, being the sixth embodiment, is that after the non-shock noise is suppressed for the degraded sound power spectrum, being an output of the conversion unit 2, the above the degraded sound is supplied to the shock noise detection unit 10, the sound detection unit 9, and the subtracter 12. For this, a non-shock noise suppression unit 7 has been added.

The suppression coefficient calculation unit 15 and the multiplier 16 realize the shock noise suppression, which yielded by multiplying a suppression coefficient having a value of 0 to 1, instead of realizing the shock noise suppression with subtraction. The method of calculating the suppression coefficient, which is known most widely, is a minimum mean square error (MMSE) method of minimizing a mean square error of the residual signal after suppression. For the minimum mean square error method, a reference to the Patent document 1 or the like can be made. The suppression coefficient calculation unit 15, upon receipt of the estimated value of the shock noise from the shock noise estimation unit 11, and the degraded sound power spectrum from conversion unit 2, calculates the suppression coefficient, and supplies it to the multiplier 16. The multiplier 16, to which the degraded sound power spectrum and the suppression coefficient have been supplied, supplies a product thereof, being a multiplication result, as a shock noise suppression signal to the smoothing unit 13.

Figure 16:
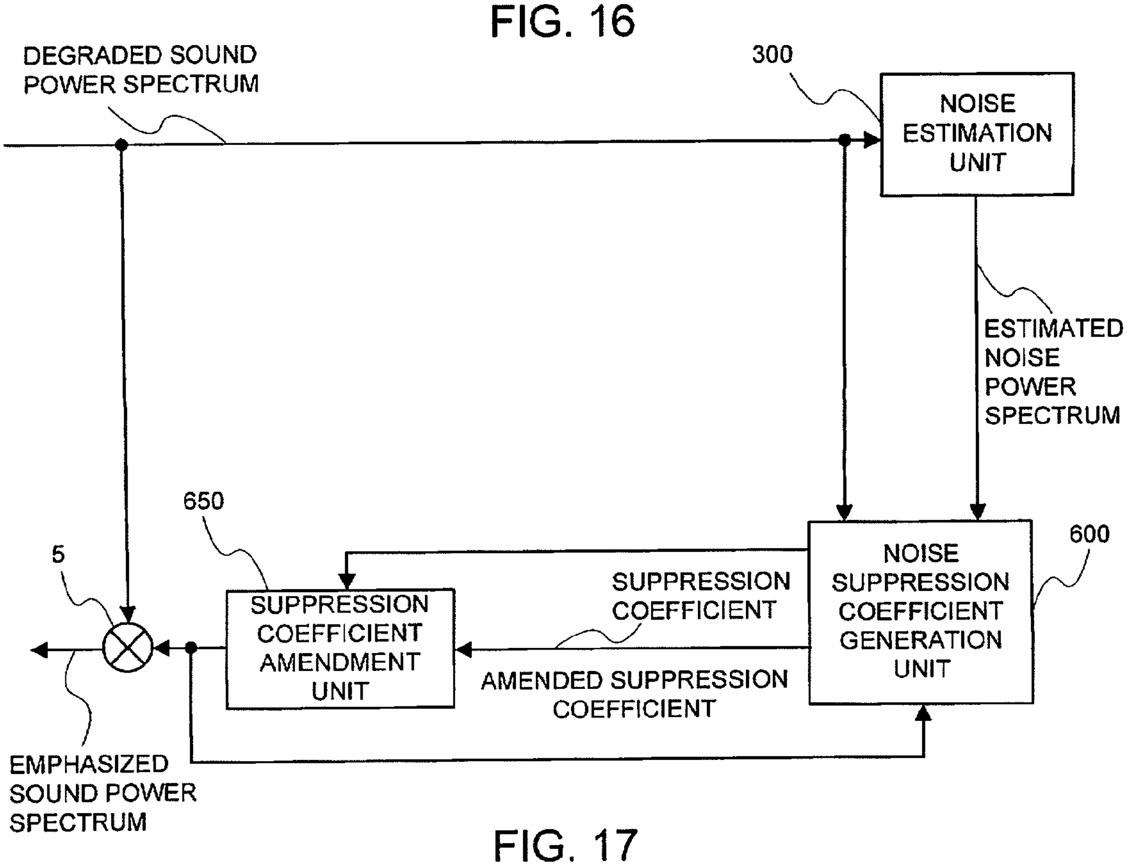
FIG. 16 is a block diagram illustrating a configuration of a non-shock noise suppression unit being included in FIG. 15.

FIG. 16 is a block diagram illustrating a configuration example of the non-shock noise suppression unit 7 being included in FIG. 15. The degraded sound power spectrum divided into a plurality of the frequency components in the conversion unit 2 of FIG. 15 is multiplexed, and supplied to a noise estimation unit 300, a noise suppression coefficient generation unit 600 and a multiplier 5. The noise estimation unit 300 employs the degraded sound power spectrum, estimates the power spectrum of the noise being included therein for each of a plurality of the frequency components, and conveys it to the noise suppression coefficient generation unit 600. As one example of a technique of estimating the noise, there exists the technique of weighting the degraded sound by a past signal-to-noise ratio, and defining it to be a noise component, which is described in details in the Patent document 1. The number of the estimated noise power spectra is identical to that of the frequency components. The noise suppression coefficient generation unit 600 generates the suppression coefficient for obtaining the noise-suppressed emphasized-sound by employing the supplied degraded sound power spectrum and the estimated nose power spectrum, and multiplying the degraded sound by them, and outputs this. The output of the noise suppression coefficient generation unit 600 is the suppression coefficients of which the number is identical to the number of the frequency components because the suppression coefficient is obtained frequency component by frequency component. As one example of a method of generating the noise suppression coefficient, the minimum mean square short-time spectrum amplitude method of minimizing a mean square power of the emphasized sound is widely employed, which is described in details in the Patent document 1. The suppression coefficients generated frequency by frequency are supplied to the suppression coefficient amendment unit 650. On the other hand, the noise suppression coefficient generation unit 600 estimates an inherent SNR frequency by frequency in order to generate the suppression coefficient. The estimated inherent SNR is employed for generating the suppression coefficient, and simultaneously therewith, is supplied to the suppression coefficient amendment unit 650. The suppression coefficient amendment unit 650 obtains the amended suppression coefficient by employing the estimated inherent SNR and the suppression coefficient, supplies this to the multiplier 5, and simultaneously therewith, feedbacks it to the noise suppression coefficient generation unit 600. The multiplier 5 multiplies the degraded sound supplied from the conversion unit 2 by the suppression coefficient supplied from the noise suppression coefficient generation unit 600 frequency by frequency, and conveys its product as a power spectrum of the emphasized sound to the inverse conversion unit 3. The inverse conversion unit 3 inverse-converts the emphasized sound power spectrum supplied from the multiplier 5 and the phase of the degraded sound supplied from the conversion unit 2 in all, and supplies it as an emphasized sound signal sample to the output terminal 4. While an example of employing the power spectrum was explained in the process performed so far, it is widely known that an amplitude value equivalent to a root square of the power spectrum can be employed instead of it.

Figure 17:
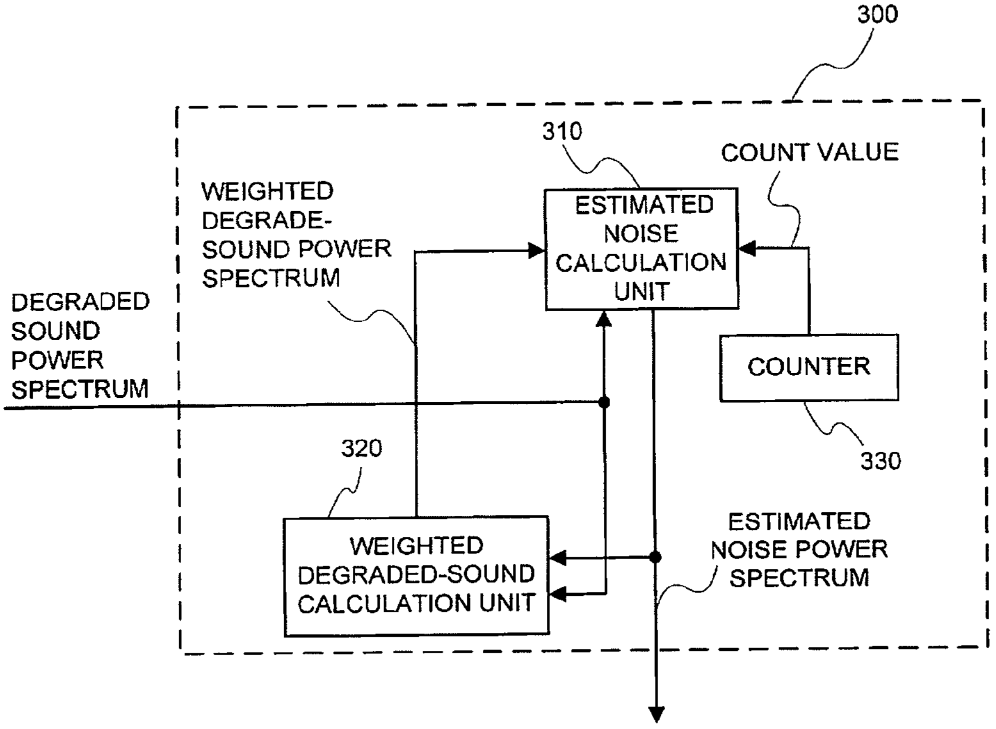
FIG. 17 is a block diagram illustrating a configuration of a noise estimation unit being included in FIG. 16.

FIG. 17 is a block diagram illustrating a configuration of the noise estimation unit 300 being included in FIG. 16. The noise estimation unit 300 is configured of an estimated noise calculation unit 310, a weighted degraded-sound calculation unit 320, and a counter 330. The degraded sound power spectrum supplied to the noise estimation unit 300 is conveyed to the estimated noise calculation unit 310 and the weighted degraded-sound calculation unit 320. The weighted degraded-sound calculation unit 320 calculates a weighted degraded-sound power spectrum by employing the supplied degraded-sound power spectrum and the estimated noise power spectrum, and conveys it to the estimated noise calculation unit 310. The estimated noise calculation unit 310 estimates the power spectrum of the noise by employing the degraded-sound power spectrum, the weighted degraded-sound power spectrum, and a counter value being supplied from the counter 330, outputs it as an estimated noise power spectrum, and simultaneously therewith, feedbacks it to the weighted degraded-sound calculation unit 320.

Figure 18:
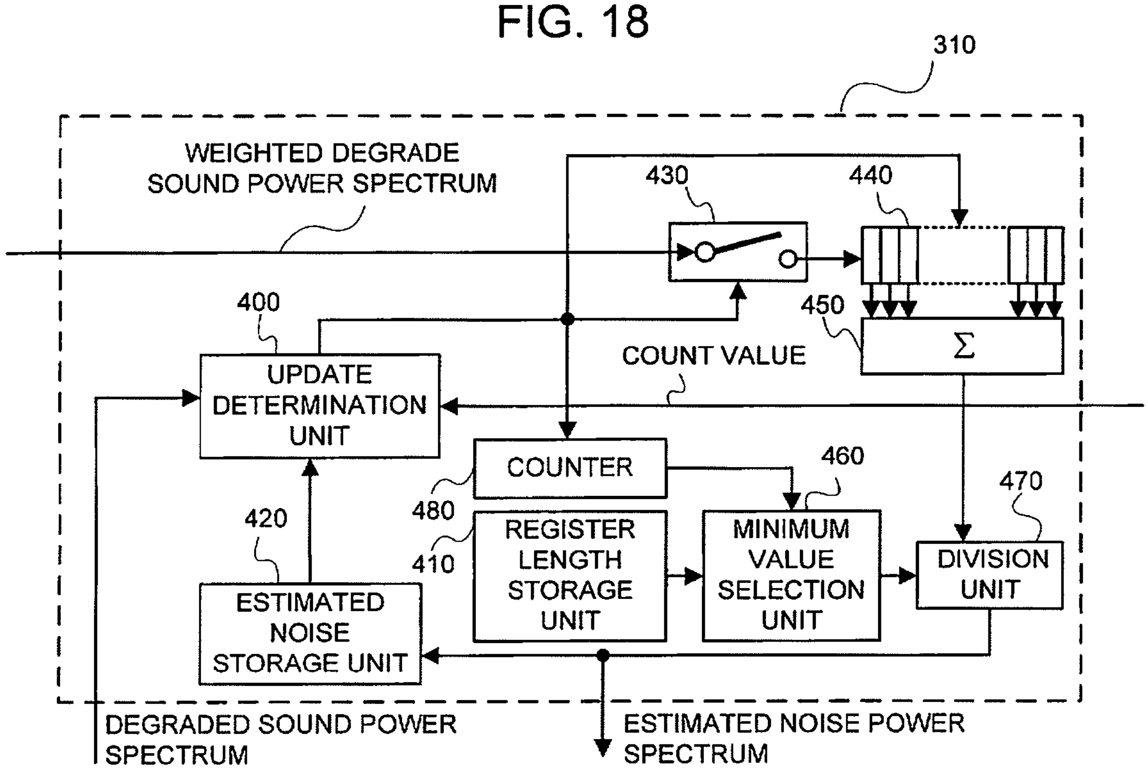
FIG. 18 is a block diagram illustrating a configuration of an estimated noise calculation unit being included in FIG. 17.

FIG. 18 is a block diagram illustrating a configuration of the estimated noise calculation unit 310 being included in FIG. 17. The estimated noise calculation unit 310 includes an update determination unit 400, a register length storage unit 410, an estimated noise storage unit 420, a switch 430, a shift register 440, an adder 450, a minimum values selection unit 460, a division unit 470, and a counter 480. The weighted degraded-sound power spectrum is supplied to the switch 430. When the switch 430 closes a circuit, the weighted degraded-sound power spectrum is conveyed to the shift register 440. The shift register 440, responding to a control signal being supplied from the update determination unit 400, shifts a storage value of the internal register to the neighboring register. A shift register length is equal to a value stored in the register length storage unit 410 to be later described. All of register outputs of the shift register 440 are supplied to the adder 450. The adder 450 adds all of the supplied register outputs, and conveys an addition result to the division unit 470.

On the other hand, the count value, the by-frequency degraded-sound power spectrum, and the by-frequency estimated-noise power spectrum are supplied to the update determination unit 400. The update determination unit 400 outputs "1" at any time until the count value reaches a pre-set value, "1" when it has been determined that the inputted degraded sound signal is noise after it reaches, and "0" in the cases other than it, respectively, and coveys it to the counter 480, the switch 430, and the shift register 440. The switch 430 closes the circuit when the signal supplied from the update determination unit is "1", and opens the circuit when it is "0". The counter 480 increases the count value when the signal supplied from the update determination unit is "1", and does not change the count value when it is "0". The shift register 440 incorporates the signal sample being supplied from the switch 430, of which the sample number is one, when the signal supplied from the update determination unit is "1", and simultaneously therewith, shifts the storage value of the internal register to the neighboring register. The output of the counter 480 and the output of the register length storage unit 410 are supplied to the minimum value selection unit 460.

The minimum value selection unit 460 selects one of the supplied count value and register length, which is smaller, and conveys it to the division unit 470. The division unit 470 divides the addition value of the degraded sound power spectrum supplied from the adder 450 by one of the count value and the register length, which is smaller, and outputs a quotient as a by-frequency estimated-noise power spectrum $\lambda_n(k)$. Upon defining $B_n(k)$ (n=0, 1, . . . , N−1) as a sample value of the degraded sound power spectrum saved in the shift register 440, $\lambda_n(k)$ is given by the following equation.

$$\lambda_n(k) = \frac{1}{N}\sum_{n=0}^{N-1} B_n(k) \quad \text{[Numerical equation 9]}$$

Where, N is one of the count value and the register length, which is smaller. The addition value is divided firstly by the count value, and later by the register length because the count value is increased monotonously, to begin with zero. Dividing the addition value by the register length means that the average value of the values stored in the shift register is obtained. At first, a sufficiently many values have not been stored in the shift register 440, whereby the division is executed by using the number of the registers into which the value has been actually stored. The number of the registers in which the value has been actually stored is equal to the count value when the count value is smaller than the register length, and becomes equal to the register length when the former becomes larger than the latter.

Figure 19:
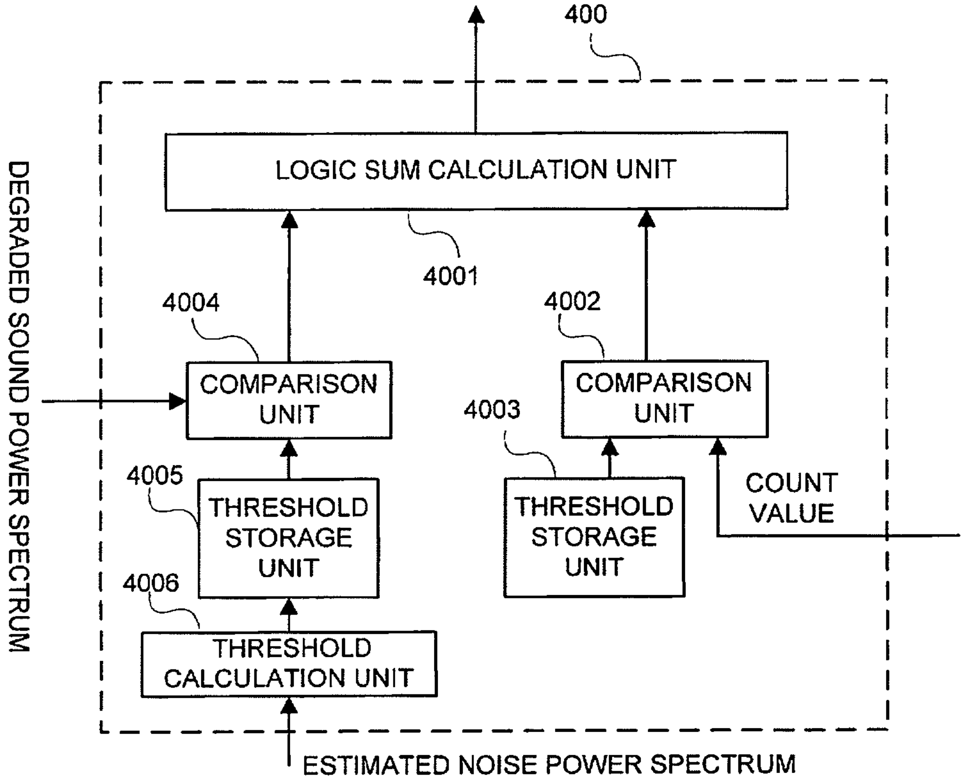
FIG. 19 is a block diagram illustrating a configuration of an update determination unit being included in FIG. 18.

FIG. 19 is a block diagram illustrating a configuration of the update determination unit 400 being included in FIG. 18. The update determination unit 400 includes a logic sum calculation unit 4001, comparison units 4004 and 4002, threshold storage units 4005 and 4003, and a threshold calculation unit 4006. The count value being supplied from the counter 330 of FIG. 17 is conveyed to the comparison unit 4002. The threshold as well, being an output of the threshold storage unit 4003, is conveyed to the comparison unit 4002. The comparison unit 4002 compares the supplied count value with the supplied threshold, and conveys "1" to the logic sum calculation unit 4001 when the former is smaller than the latter, and "0" when the former is larger than the latter. On the other hand, the threshold calculation unit 4006 calculates the value that corresponds to the estimated noise power spectrum being supplied from the estimated noise storage unit 420 of FIG. 18, and outputs it as a threshold to the threshold storage unit 4005. As a simplest method of calculating the threshold, a constant multiplication of the estimated noise power spectrum is defined as a threshold. Besides it, it is also possible to calculate the threshold by employing a high-order polynomial expression or a non-linear function. The threshold storage unit 4005 stores the threshold outputted from the threshold calculation unit 4006, and outputs the threshold stored one frame before to the comparison unit 4004. The comparison unit 4004 compares the threshold being supplied from the threshold storage unit 4005 with the degraded sound power spectrum being supplied from the conversion unit 2 of FIG. 1, and outputs "1" when the latter is smaller than the former, and "0" when the latter is larger to the logic sum calculation unit 4001. That is, it is determined whether or not the degraded sound signal is noise based upon magnitude of the estimated noise power spectrum. The logic sum calculation unit 4001 calculates a logic sum of the output value of the comparison unit 4002 and the output value of the comparison unit 4004, and outputs a calculation result to the switch 430, the shift register 440, and the counter 480 of FIG. 18. In such a manner, when the degraded sound power is smaller not only in an initial state and in a soundless section but also in a sounded section, the update determination unit 400 outputs "1". That is, the estimated noise is updated. The estimated noise can be updated for each frequency because the calculation of the threshold is executed for each frequency.

Figure 20:
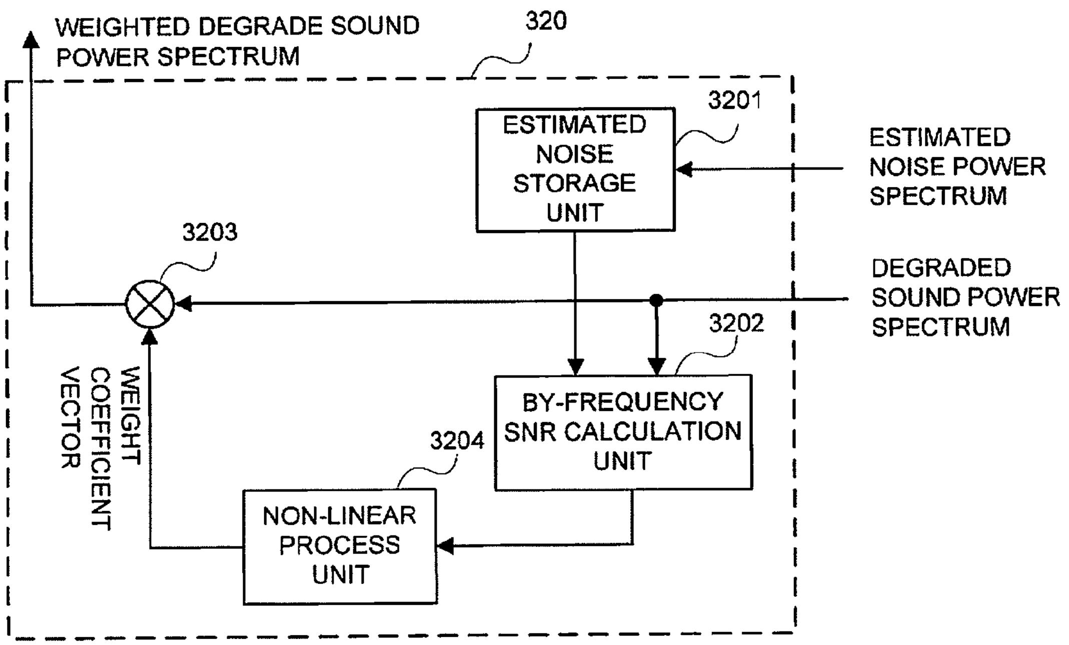
FIG. 20 is a block diagram illustrating a configuration of a weighted degraded-sound calculation unit being included in FIG. 17.

FIG. 20 is a block diagram illustrating a configuration of the weighted degraded-sound calculation unit 320. The weighted degraded-sound calculation unit 320 includes an estimated noise storage unit 3201, a by-frequency SNR calculation unit 3202, a non-linear process unit 3204, and a multiplier 3203. The estimated noise storage unit 3201 stores the estimated noise power spectrum being supplied from the estimated noise calculation unit 310 of FIG. 17, and outputs the estimated noise power spectrum stored one frame before to the by-frequency SNR calculation unit 3202. The by-frequency SNR calculation unit 3202 obtains the SNR for each frequency band by employing the estimated noise power spectrum being supplied from the estimated noise storage unit 3201 and the degraded sound power spectrum being supplied from the conversion unit 2 of FIG. 1, and outputs it to the non-linear process unit 3204. Specifically, the by-frequency SNR calculation unit 3202, according to the following equation, divides the supplied degraded sound power spectrum by the estimated noise power spectrum, thereby to obtain a by-frequency SNR $\gamma_n(k)$-hat.

$$\hat{\gamma}_n(k) = \frac{|Y_n(k)|^2}{\lambda_{n-1}(k)} \quad \text{[Numerical equation 10]}$$

Where, $\lambda_{n-1}(k)$ is the estimated noise power spectrum stored one frame before.

The non-linear process unit 3204 calculates a weight coefficient vector by employing the SNR being supplied from the by-frequency SNR calculation unit 3202, and outputs the weight coefficient vector to the multiplier 3203. The multiplier 3203 calculates a product of the degraded sound power spectrum being supplied from the conversion unit 2 of FIG. 1 and the weight coefficient vector being supplied from the non-linear process unit 3204 frequency band by frequency band, and outputs a weighted degraded-sound power spectrum to the estimated noise calculation unit 310 of FIG. 17.

Figure 21:
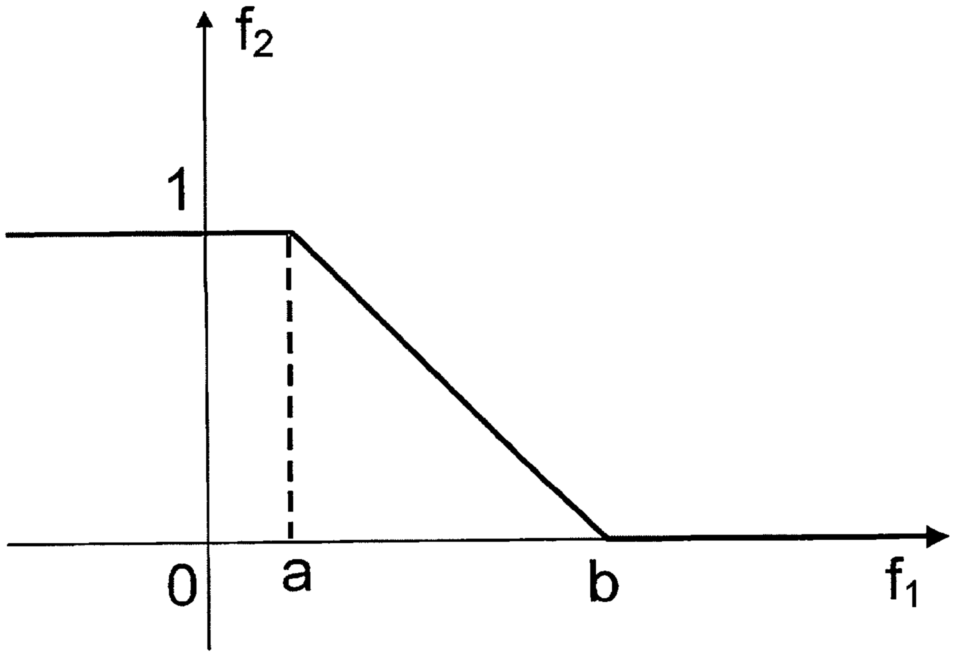
FIG. 21 is a view illustrating a non-linear function being included in FIG. 20.

The non-linear process unit 3204 has a non-linear function for outputting an actual value that corresponds to each of multiplexed input values. An example of the non-linear function is shown in FIG. 21. An output value $f_2$ of the non-linear function shown in FIG. 21 at the time of defining $f_1$ as an input value is given by the following equation.

$$f_2 = \begin{cases} 1, & f_1 \le a \\ \dfrac{f_1 - b}{a - b} & a < f_1 \le b \\ 0, & b < f_1 \end{cases} \qquad \text{[Numerical equation 11]}$$

Where, a and b are an optional actual number, respectively.

The non-linear process unit 3204 processes the by-frequency-band SNR being supplied from the by-frequency SNR calculation unit 3202 with the non-linear function, thereby to obtain the weight coefficient, and conveys it to the multiplier 3203. That is, the non-linear process unit 3204 outputs the weight coefficient of 1 up to 0 that corresponds to the SNR. It outputs 1 when the SNR is small, and 0 when the SNR is large.

The weight coefficient by which the degraded sound power spectrum is multiplexed in the multiplier 3203 of FIG. 20 is a value that corresponds to the SNR, and the larger the SNR is, namely, the larger the sound component being included in the degraded sound is, the smaller the value of the weight coefficient becomes. While, as a rule, the degraded sound power spectrum is employed for updating the estimated noise, conducting a weighting, which corresponds to the SNR, for the degraded sound power spectrum, which is employed for updating the estimated noise, enables an influence of the sound component being included in the degraded sound power spectrum to be reduced, and a higher-precision noise estimation to be performed. Additionally, while an example employing the non-linear function for calculating the weight coefficient was shown, it is also possible to employ the function of the SNR that is expressed in other formats, for example, a linear function and a high-order polynomial expression besides the non-linear function.

Figure 22:
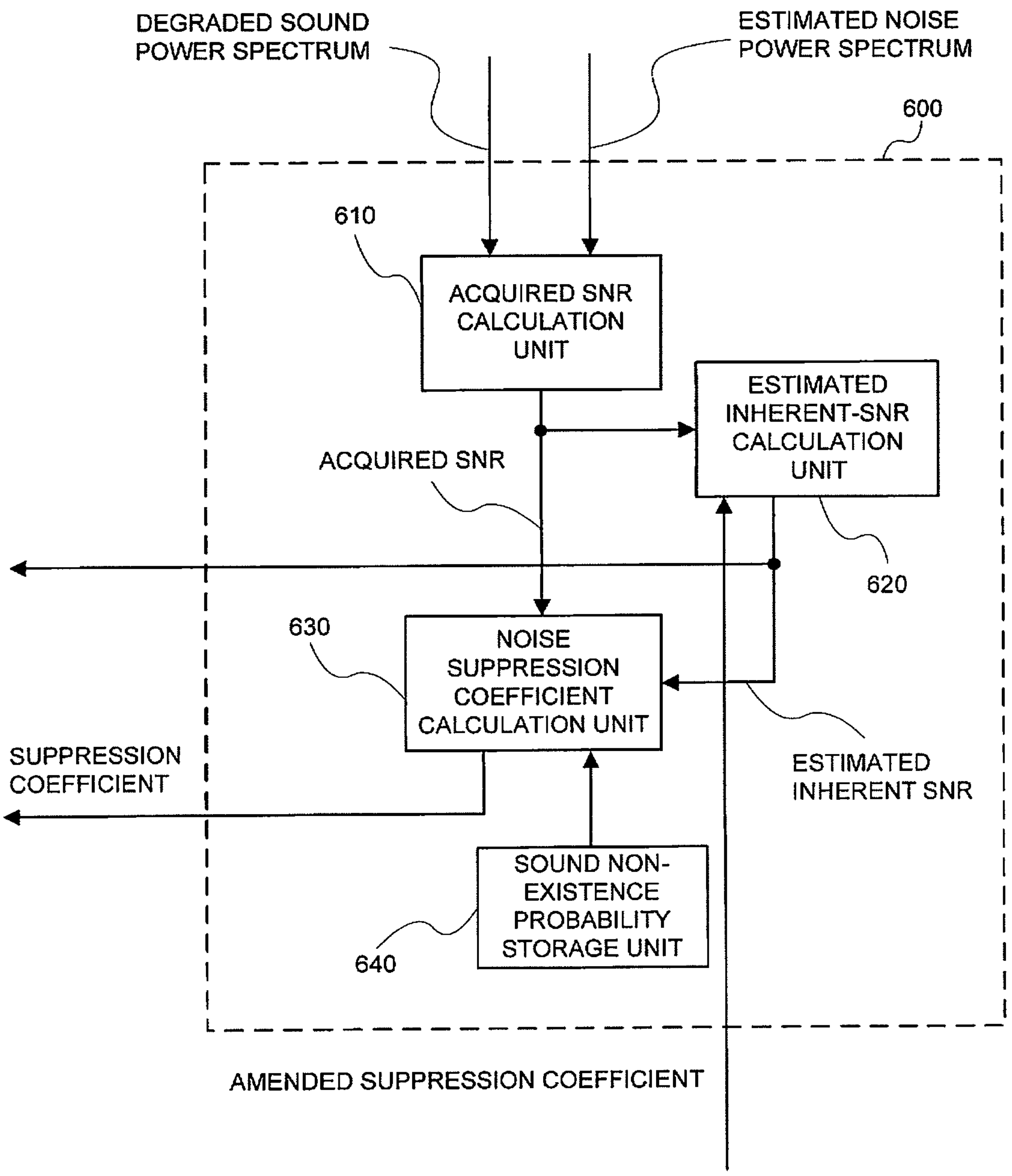
FIG. 22 is a block diagram illustrating a configuration of a noise suppression coefficient generation unit being included in FIG. 16.

FIG. 22 is a block diagram illustrating a configuration of the noise suppression coefficient generation unit 600 being included in FIG. 16. The noise suppression coefficient generation unit 600 includes an acquired SNR calculation unit 610, an estimated inherent-SNR calculation unit 620, a noise suppression coefficient calculation unit 630, and a sound non-existence probability storage unit 640. The acquired SNR calculation unit 610 calculates the acquired SNR for each frequency by employing the inputted degraded sound power spectrum and the estimated noise power spectrum, and supplies a calculation result to the estimated inherent-SNR calculation unit 620 and the noise suppression coefficient calculation unit 630. The estimated inherent-SNR calculation unit 620 estimates the inherent SNR by employing the inputted acquired SNR and the amended suppression coefficient supplied from the suppression coefficient amendment unit 650, conveys an estimation result as an estimated inherent SNR to the noise suppression coefficient calculation unit 630, and simultaneously therewith, outputs it. The noise suppression coefficient calculation unit 630 generates a noise suppression coefficient by employing the acquired SNR supplied and the estimated inherent SNR each of which has been supplied as an input, and the sound non-existence probability being supplied from the sound non-existence probability storage unit 640, and outputs this.

Figure 23:
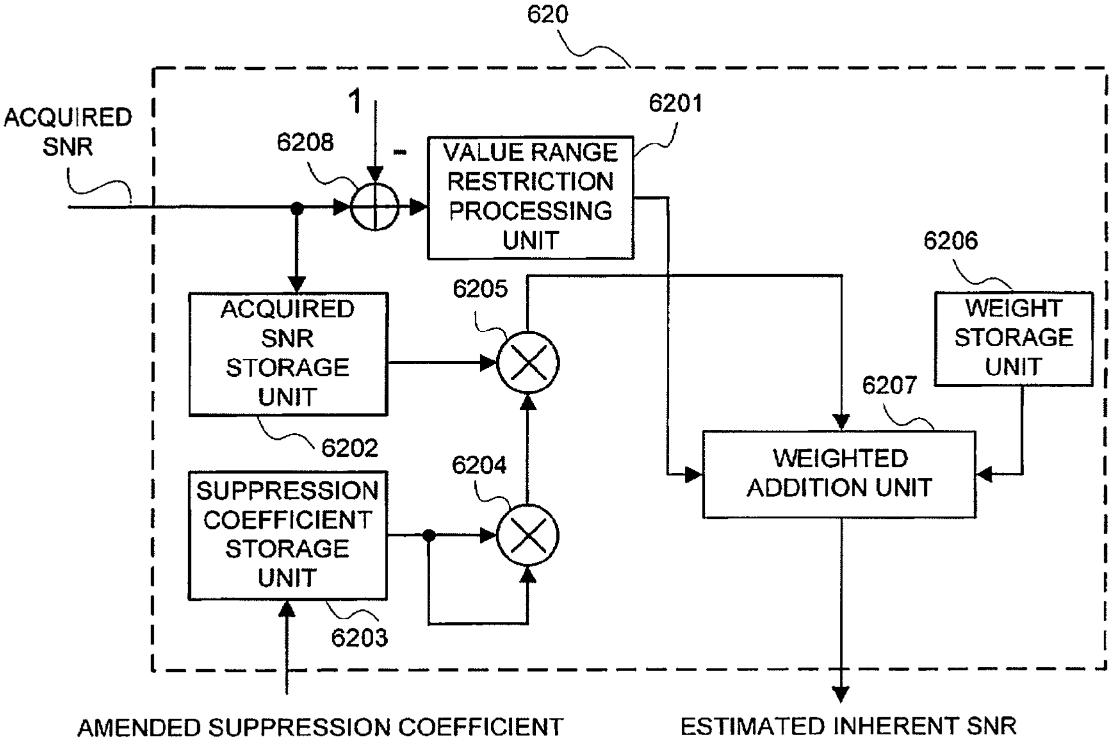
FIG. 23 is a block diagram illustrating a configuration of an estimated inherent-SNR calculation unit being included in FIG. 22.

FIG. 23 is a block diagram illustrating a configuration of the estimated inherent-SNR calculation unit 620 being included in FIG. 22. The estimated inherent-SNR calculation unit 620 includes a value range restriction processing unit 6201, an acquired SNR storage unit 6202, a suppression coefficient storage unit 6203, multipliers 6204 and 6205, a weight storage unit 6206, a weighted addition unit 6207, and an adder 6208. An acquired SNR $\gamma_n(k)$ (k=0, 1, . . . , M−1) being supplied from the acquired SNR calculation unit 610 of FIG. 22 is conveyed to the acquired SNR storage unit 6202 and the adder 6208. The acquired SNR storage unit 6202 stores the acquired SNR $\gamma_n(k)$ of the n-th frame and conveys the acquired SNR $\gamma_{n-1}(k)$ of the (n−1)-th frame to the multiplier 6205. The amended suppression coefficient $G_n(k)$-bar (k=0, 1, . . . , M−1) being supplied from the suppression coefficient amendment unit 650 of FIG. 16 is conveyed to the suppression coefficient storage unit 6203. The suppression coefficient storage unit 6203 stores the amended suppression coefficient $G_n(k)$-bar of the n-th frame and conveys the amended suppression coefficient $G_{n-1}(k)$-bar of the (n−1)-th frame to the multiplier 6204. The multiplier 6204 obtains $G^2_{n-1}(k)$-bar by squaring the supplied $G_n(k)$-bar, and conveys it to the multiplier 6205. The multiplier 6205 obtains $G^2_{n-1}(k)$-bar $\gamma_{n-1}(k)$ by multiplying $G^2_{n-1}(k)$-bar by $\gamma_{n-1}(k)$ with respect to k=0, 1, . . . , M−1, and conveys a result as a past estimated SNR 922 to the weighted addition unit 6207.

−1 is supplied to another terminal of the adder 6208, and an addition result $\gamma_n(k)-1$ is conveyed to the value range restriction processing unit 6201. The value range restriction processing unit 6201 subjects the addition result $\gamma_n(k)-1$ supplied from the adder 6208 to an operation by a value range restriction operator P[•], and conveys $P[\gamma_n(k)-1]$, being a result, as a momentarily-estimated SNR 921 to the weighted addition unit 6207. Where, P[x] is decided by the following equation.

$$P[x] = \begin{cases} x, & x > 0 \\ 0, & x \le 0 \end{cases} \qquad \text{[Numerical equation 12]}$$

Further, a weight 923 is supplied to the weighted addition unit 6207 from the weight storage unit 6206. The weighted addition unit 6207 obtains an estimated inherent SNR 924 by employing these supplied momentarily-estimated SNR 921, past estimated SNR 922, and weight 923. Upon defining the weight 923 as α, and $\xi_n(k)$-hat as an estimated inherent SNR, $\xi_n(k)$-hat is calculated by the following equation.

$$\hat{\xi}(k)=\alpha\gamma_{n-1}(k)\overline{G}_{n-1}{}^2(k)+(1-\alpha)P[\gamma_n(k)-1] \qquad \text{[Numerical equation 13]}$$

Where, it is assumed that $G^2_{-1}(k)\gamma_{-1}(k)$-bar=1.

Figure 24:
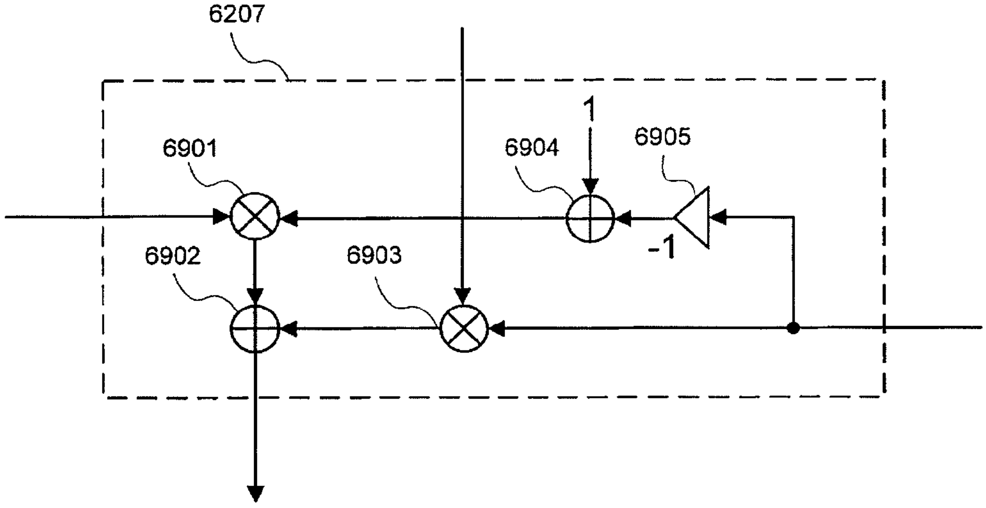
FIG. 24 is a block diagram illustrating a configuration of a weighted addition unit being included in FIG. 23.

FIG. 24 is a block diagram illustrating a configuration of the weighted addition unit 6207 being included in FIG. 23. The weighted addition unit 6207 includes multipliers 6901 and 6903, a constant multiplier 6905, and adders 6902 and 6904. The by-frequency-band momentarily-estimated SNR is supplied from the value range restriction processing unit 6201 of FIG. 23, the past estimated SNR from the multiplier 6205 of FIG. 23, and the weight from the weight storage unit 6206 of FIG. 23 as an input, respectively. The weight having a value α is conveyed to the constant multiplier 6905 and the multiplier 6903. The constant multiplier 6905 conveys −α obtained by multiplying the input signal by −1 to the adder 6904. 1 is supplied as another input to the adder 6904, and the output of the adder 6904 becomes 1−α, being a sum of both. 1−α is supplied to the multiplier 6901 and is multiplied by a by-frequency-band momentarily-estimated SNR P[$\gamma_n$(k)−1], being another input, and (1−α)P[$\gamma_n$(k)−1], being a product, is conveyed to the adder 6902. On the other hand, the multiplier 6903 multiplies α supplied as the weight by the past estimated SNR, and conveys $\alpha G^2_{n-1}$(k)-bar $\gamma_{n-1}$(k), being a product, to the adder 6902. The adder 6902 outputs a sum of (1−α)P[$\gamma_n$(k)−1] and $\alpha G_{n-1}{}^2$(k)-bar $\gamma_{n-1}$(k) as a by-frequency-band estimated inherent SNR.

Figure 25:
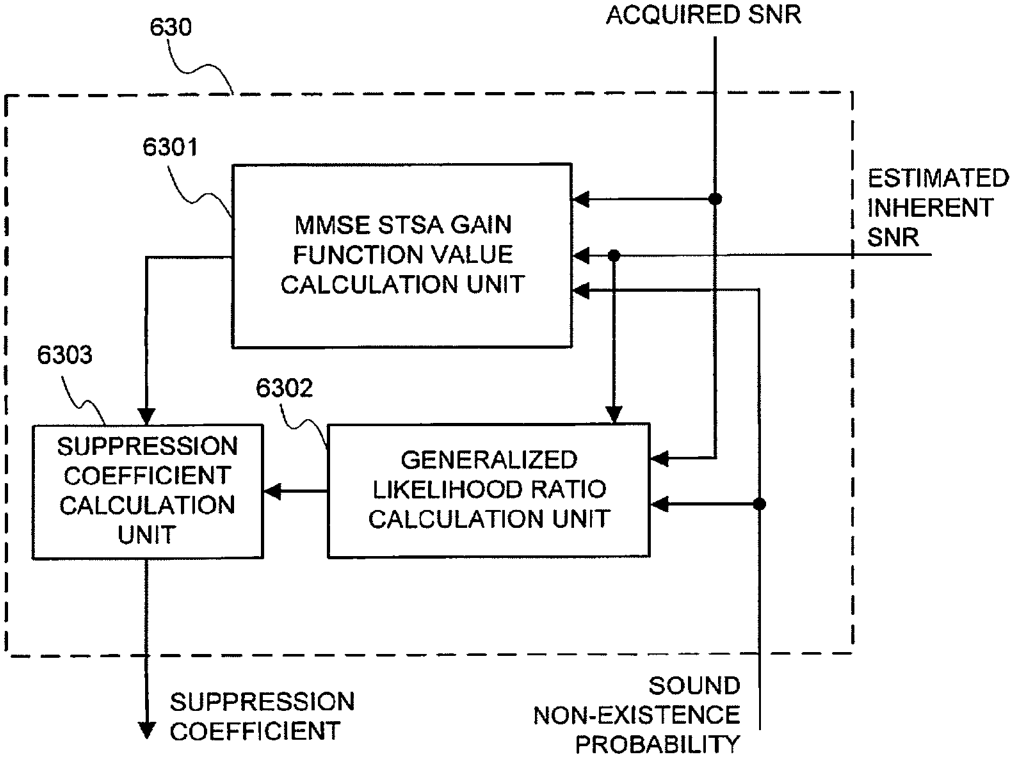
FIG. 25 is a block diagram illustrating a configuration of a noise suppression coefficient generation unit being included in FIG. 22.

FIG. 25 is a block diagram illustrating a configuration of the noise suppression coefficient calculation unit 630 being included in FIG. 22. The noise suppression coefficient calculation unit 630 includes an MMSE STSA gain function value calculation unit 6301, a generalized likelihood ratio calculation unit 6302, and a suppression coefficient calculation unit 6303. Hereinafter, how to calculate the suppression coefficient will be explained based upon the calculation equation described in Non-patent document 3 (Non-patent document 3: IEEE TRANSACTIONS ON ACOUSTICS, SPEECH, AND SIGNAL PROCESSING, Vol. 32, No. 6, pp. 1109 to 1121, December, 1984).

It is assumed that the frame number is n, the frequency number is k, $\gamma_n$(k) is a by-frequency acquired SNR being supplied from the acquired SNR calculation unit 610 of FIG. 22, $\xi_n$(k)-hat is a by-frequency estimated inherent SNR being supplied from the estimated inherent-SNR calculation unit 620 of FIG. 22, and q is a sound non-existence probability being supplied from the sound non-existence probability storage unit 640 of FIG. 22.

Further, it is assumed that $\eta_n$(k)=$\xi_n$(k)-hat/(1−q), and $v_n$(k)=($\eta_n$(k)$\gamma_n$(k))/(1+$\eta_n$(k)). The MMSE STSA gain function value calculation unit 6301 calculates an MMSE STSA gain function value frequency band by frequency band based upon the acquired SNR $\gamma_n$(k) being supplied from the acquired SNR calculation unit 610 of FIG. 22, the estimated inherent SNR $\xi_n$(k)-hat being supplied from the estimated inherent-SNR calculation unit 620 of FIG. 22, and the sound non-existence probability q being supplied from the sound non-existence probability storage unit 640 of FIG. 22, and outputs it to the suppression coefficient calculation unit 6303. An MMSE STSA gain function value $G_n$(K) by the frequency band is given by the following equation.

[Numerical equation 14]

$$G_n(k) = \frac{\sqrt{\pi}}{2}\frac{\sqrt{v_n(k)}}{\gamma_n(k)} \exp\left(-\frac{v_n(k)}{2}\right)\left[(1+v_n(k))I_0\left(\frac{v_n(k)}{2}\right) + v_n(k)I_1\left(\frac{v_n(k)}{2}\right)\right]$$

Where, $I_0$(z) is a zero-order modified Bessel function, and $I_1$(z) is a first-order modified Bessel function. The modified Bessel function is described in Non-patent document 4 (Non-patent document 4: Mathematics Dictionary, 374. G page, Iwanami Shoten, Publishers, 1985)

The generalized likelihood ratio calculation unit 6302 calculates a generalized likelihood ratio frequency band by frequency band based upon the acquired SNR $\gamma_n$(k) being supplied from the acquired SNR calculation unit 610 of FIG. 22, the estimated inherent SNR $\xi_n$(k)-hat being supplied from the estimated inherent-SNR calculation unit 620 of FIG. 22, and the sound non-existence probability q being supplied from the sound non-existence probability storage unit 640 of FIG. 22, and conveys it to the suppression coefficient calculation unit 6303. A generalized likelihood ratio $\Lambda_n$(k) by the frequency band is given by the following equation.

[Numerical equation 15]

$$\Lambda_n(k) = \frac{1-q}{q}\frac{\exp(v_n(k))}{1+\eta_n(k)}$$

The suppression coefficient calculation unit 6303 calculates the suppression coefficient frequency band by frequency band from the MMSE STSA gain function value $G_n$(k) being supplied from the MMSE STSA gain function value calculation unit 6301, and the generalized likelihood ratio $\Lambda_n$(k) being supplied from the generalized likelihood ratio calculation unit 6302, and outputs it to the suppression coefficient amendment unit 650 of FIG. 16. A suppression coefficient $G_n$(k)-bar by the frequency band is given by the following equation.

[Numerical equation 16]

$$\overline{G}_n(k) = \frac{\Lambda_n(k)}{\Lambda_n(k)+1}G_n(k)$$

It is also possible to obtain the SNR common to a wide band that is configured of a plurality of the frequency bands and to employ it instead of calculating the SNR frequency band by frequency band.

Figure 26:
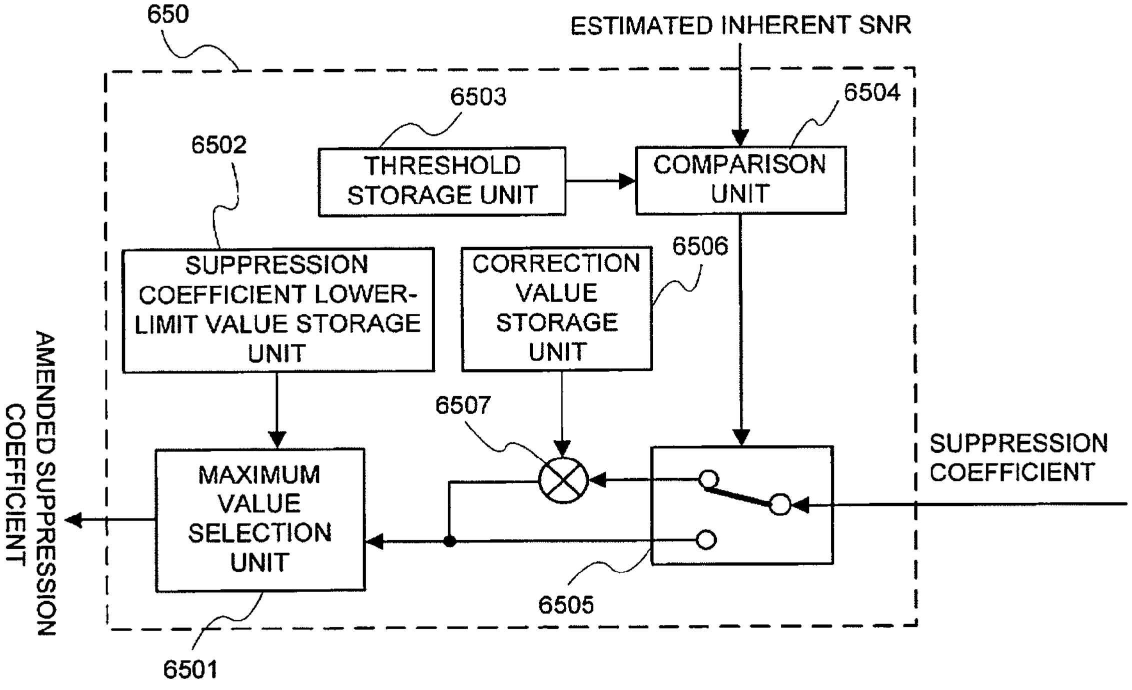
FIG. 26 is a block diagram illustrating a configuration of a suppression coefficient amendment unit being included in FIG. 16.

FIG. 26 is a block diagram illustrating a configuration of the suppression coefficient amendment unit 650 being included in FIG. 16. The suppression coefficient amendment unit 650 includes a maximum value selection unit 6501, a suppression coefficient lower-limit value storage unit 6502, a threshold storage unit 6503, a comparison unit 6504, a switch 6505, a correction value storage unit 6506, and a multiplier 6507. The comparison unit 6504 compares the threshold being supplied from threshold storage unit 6503 with the estimated inherent SNR being supplied from the estimated inherent-SNR calculation unit 620 of FIG. 22 and supplies "0" to the switch 6505 when the latter is larger than the former, and "1" when the latter is smaller. The switch 6505 outputs the suppression coefficient being supplied from the noise suppression coefficient calculation unit 630 of FIG. 22 to the multiplier 6507 when the output value of the comparison unit 6504 is "1", and to the maximum value selection unit 6501 when it is "0". That is, the suppression coefficient is amended when the estimated inherent SNR is smaller than the threshold. The multiplier 6507 calculates a product of the output value of the switch 6505 and the output value of the correction value storage unit 6506, and conveys it to the maximum value selection unit 6501.

On the other hand, the suppression coefficient lower-limit value storage unit 6502 supplies the lower limit value stored by the suppression coefficient lower-limit value storage unit 6502 itself to the maximum value selection unit 6501. The maximum value selection unit 6501 compares the suppression coefficient being supplied from the noise suppression coefficient calculation unit 630 of FIG. 22 or the product calculated in the multiplier 6507 with the suppression coefficient lower limit value being supplied from the suppression coefficient lower-limit value storage unit 6502, and outputs the value, which is larger. That is, the suppression coefficient becomes a value that is larger than the lower limit value stored by the suppression coefficient lower-limit value storage unit 6502 without fail.

Figure 27:
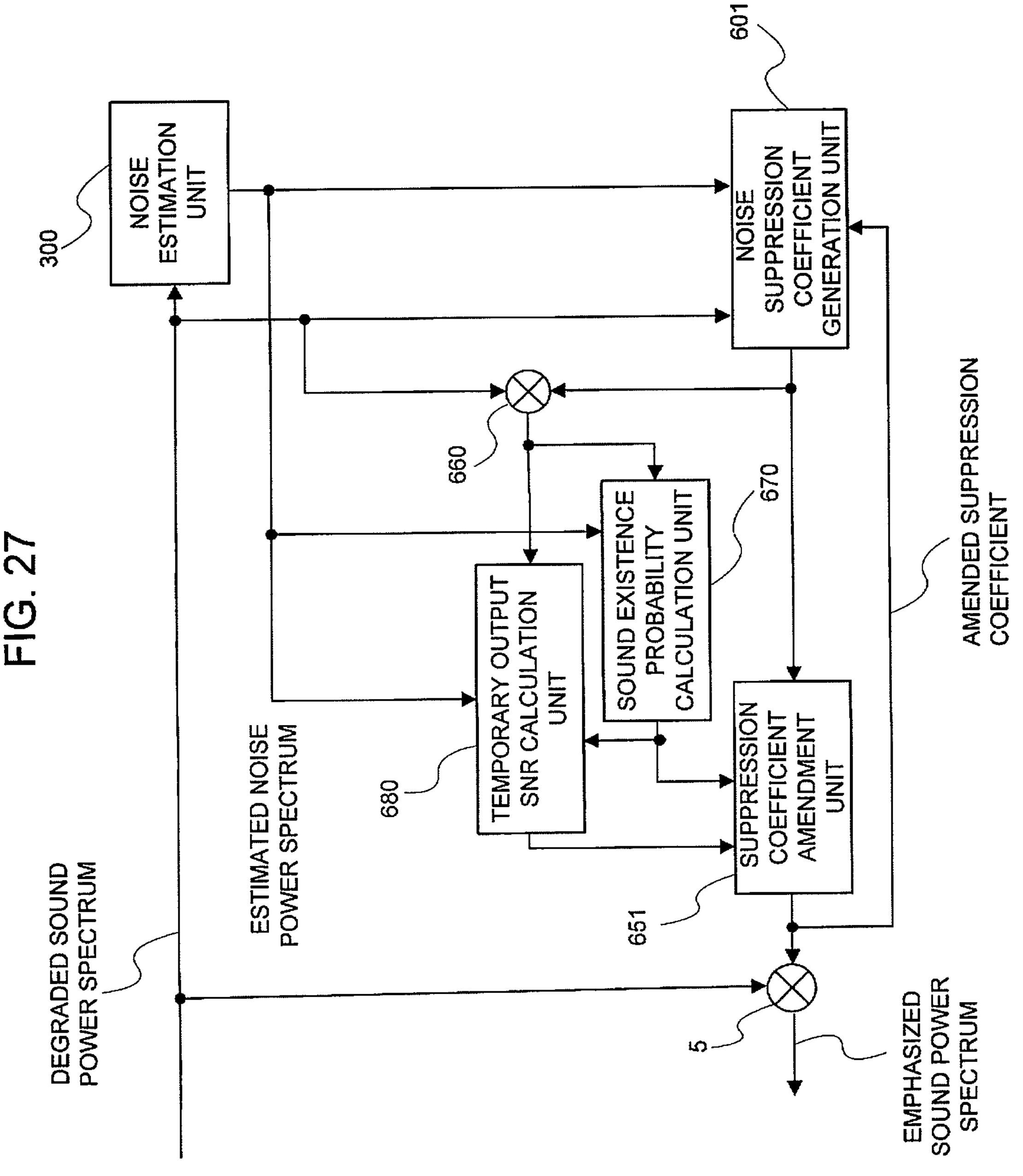
FIG. 27 is a block diagram illustrating a second configuration of the non-shock noise suppression unit being included in FIG. 15.

FIG. 27 is a block diagram illustrating a second configuration example of the non-shock noise suppression unit 7 being included in FIG. 15. A point in which FIG. 27 differs from FIG. 16, being the first configuration, is that the noise suppression coefficient generation unit 600 and the suppression coefficient amendment unit 650 have been replaced with a suppression coefficient generation unit 601 and a suppression coefficient amendment unit 651, respectively, and a multiplier 660, a sound existence probability calculation unit 670, and a temporary output SNR calculation unit 680 have been added.

The degraded sound supplied to the input terminal 1 is subjected to the transformation such as a Fourier transform in the conversion unit 2, is divided into a plurality of the frequency components, and is supplied to the noise estimation unit 300, the noise suppression coefficient generation unit 601, the multiplier 660 and the multiplier 5. The phase is conveyed to the inverse conversion unit 3. The noise estimation unit 300 estimates the power spectrum of the noise being included in the degraded sound power spectrum for each of a plurality of the frequency components, and conveys it to the noise suppression coefficient generation unit 601, the sound existence probability calculation unit 670, and the temporary output SNR calculation unit 680. The noise suppression coefficient generation unit 601 generates the suppression coefficient by employing the degraded sound power spectrum and the estimated noise power spectrum, and supplies it to the multiplier 660 and the suppression coefficient amendment unit 651. The multiplier 660 obtains a product of the degraded sound power spectrum and the suppression coefficient as a temporary output, and supplies it to the sound existence probability calculation unit 670 and the temporary output SNR calculation unit 680.

The sound existence probability calculation unit 670 obtains a sound existence probability $V_n$ from the temporary output and the estimated noise, and supplies it to the temporary output SNR calculation unit 680 and the suppression coefficient amendment unit 651. As one example of the sound existence probability, a ratio of the temporary output signal and the estimated noise can be employed. The sound existence probability is high when this ratio is large, and the sound existence probability is low when this ratio is small. The temporary output SNR calculation unit 680 obtains a temporary output SNR $\xi_n^L(k)$ from the temporary output and the estimated noise by employing the sound existence probability $V_n$, and supplies it to the suppression coefficient amendment unit 651. As one example of the temporary output SNR, a long-time output SNR, which is derived from a long-time average of the temporary output, and the estimated noise power spectrum, can be employed. The long-time average of the temporary output is updated responding to magnitude of the sound existence probability $V_n$ supplied from the sound existence probability calculation unit 670. The suppression coefficient amendment unit 651 amends the suppression coefficient $G_n$(k)-bar by employing the temporary output SNR $\xi_n^L(k)$ and the sound existence probability $V_n$, supplies it as an amended suppression coefficient $G_n$(k)-hat to the multiplier 5, and simultaneously therewith, feedbacks it to the noise suppression coefficient generation unit 601. The multiplier 5 multiplies the degraded sound supplied from the conversion unit 2 by the amended suppression coefficient supplied from the suppression coefficient amendment unit 651 frequency by frequency, and conveys its product as a power spectrum of the emphasized sound to the inverse conversion unit 3. The inverse conversion unit 3 inverse-converts the emphasized sound power spectrum supplied from the multiplier 5 and the phase of the degraded sound supplied from the conversion unit 2 in all, and supplies it as an emphasized sound signal sample to the output terminal 4.

Figure 28:
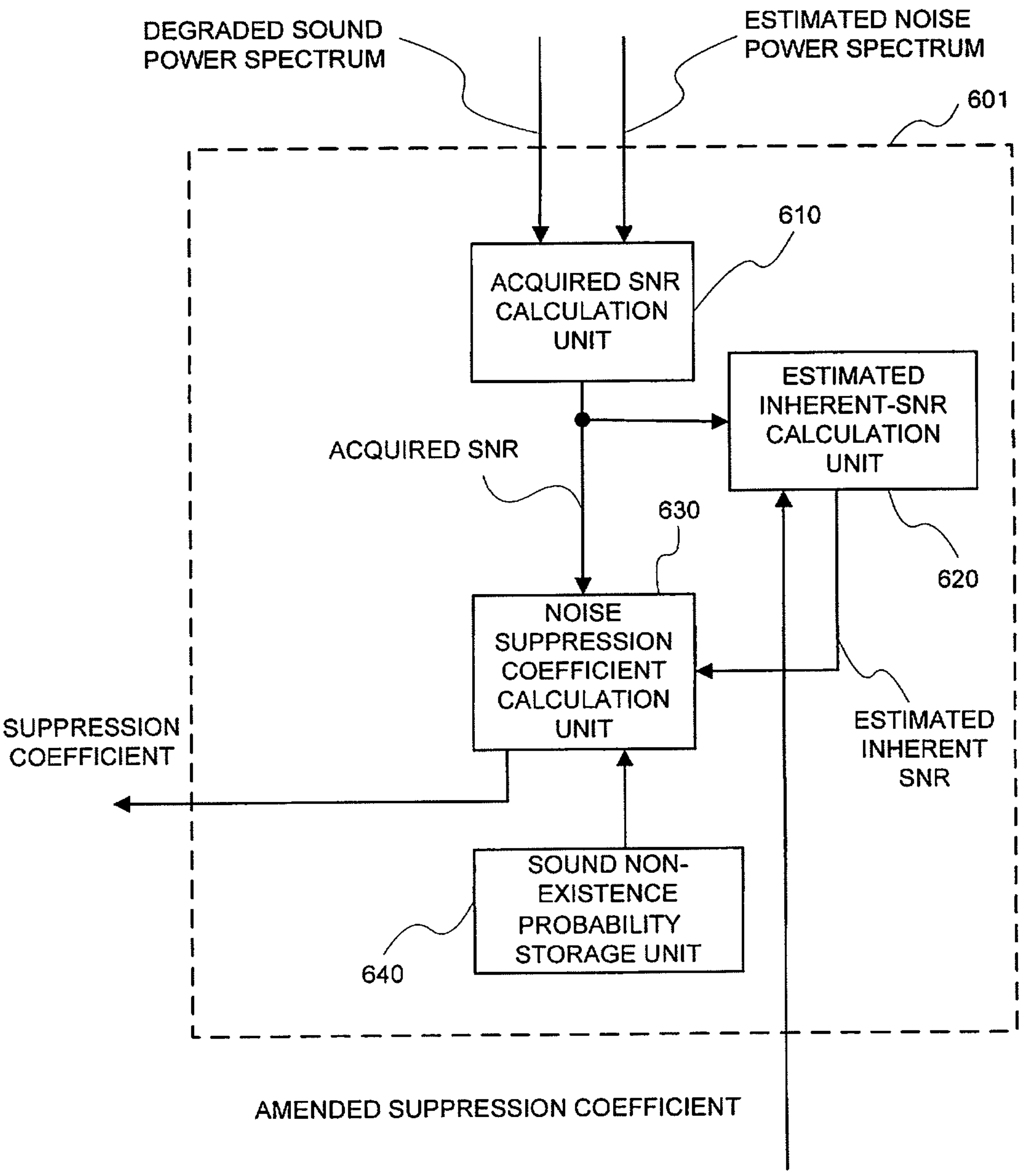
FIG. 28 is a block diagram illustrating a configuration of the noise suppression coefficient generation unit being included in FIG. 27.

FIG. 28 is a block diagram of a configuration of the noise suppression coefficient generation unit 601 being configured in FIG. 27. A comparison of it with a configuration of the noise suppression coefficient generation unit 600 shown in FIG. 22 demonstrates that it differs in a point that the estimated inherent SNR, being an output of the estimated inherent-SNR calculation unit 620, is not outputted. That is, the output of the noise suppression coefficient generation unit 601 is only the suppression coefficient.

Figure 29:
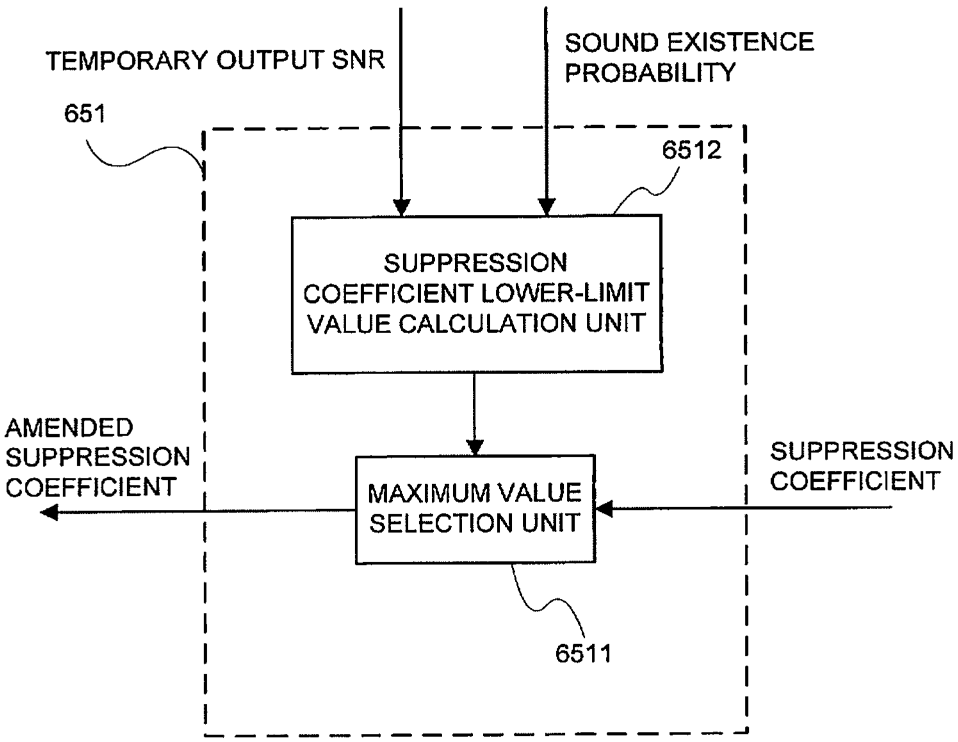
FIG. 29 is a block diagram illustrating a configuration of the suppression coefficient amendment unit being included in FIG. 27.

FIG. 29 is a block diagram of a configuration example of the suppression coefficient amendment unit 651 being configured in FIG. 27. The suppression coefficient amendment unit 651 includes a suppression coefficient lower-limit value calculation unit 6512 and a maximum value selection unit 6511. The temporary output SNR $\xi_n^L(k)$ and the sound existence probability $V_n$ are supplied to the suppression coefficient lower-limit value calculation unit 6512. The suppression coefficient lower-limit value calculation unit 6512 calculates a lower-limit value $A(V_n, \xi_n^L(k))$ of the suppression coefficient based upon the following equation by employing a function $A(\xi_n^L(k))$ and a suppression coefficient minimum-value $f_s$ corresponding to a sound section, and conveys it to the maximum value selection unit 6511.

$$A(V_n,\xi_n^L(k))=f_s\cdot V_n+(1-V_n)\cdot A(\xi_n^L(k)) \qquad \text{[Numerical equation 17]}$$

The function $A(\xi_n^L(k))$, basically, has a shape such that for a large SNR, a small value is yielded. The fact that $A(\xi_n^L(k))$ is a function assuming such a shape responding to the temporary output SNR $\xi_n^L(k)$ means that the higher the temporary output SNR is, the smaller the lower-limit value of the suppression coefficient corresponding to a non-sound section becomes. This, which corresponds to a decrease in residual noise, has an effect of reducing a discontinuity of the sound quality between the sound section and the non-sound section. Additionally, The function $A(\xi_n^L(k))$ may differ for each of all frequency components, and the common function $A(\xi_n^L(k))$ may be employed for a plurality of the frequency components. Further, it is also possible that the shape changes with a lapse of the time.

The maximum value selection unit 6511 compares the suppression coefficient $G_n$(k)-bar received from the noise suppression coefficient calculation unit 630 with the lower-limit value $A(V_n, \xi_n^L(k))$ of the suppression coefficient received from the suppression coefficient lower-limit value calculation unit 6512, and outputs the larger value as the amended suppression coefficient $G_n$(k)-hat. This process can be expressed with the following equation.

$$\hat{G}_n(k)=\begin{cases}\overline{G}_n(k) & \overline{G}_n(k)\geq A(V_n,\xi_n^L(k))\\ A(V_n,\xi_n^L(k)) & \overline{G}_n(k)<A(V_n,\xi_n^L(k))\end{cases} \qquad \text{[Numerical equation 18]}$$

That is, $f_s$ becomes a suppression coefficient minimum value when the section is completely considered as a sound section, and the value, which is decided responding to the temporary output SNR $\xi_n^L(k)$ with a monotone decrease function, becomes a suppression coefficient minimum value when the section is completely considered as a non-sound section. In a situation where the section is considered to be an in-between section of both, these values are adequately mixed. Owing to the monotone decrease of $A(\xi_n^L(k))$, the large suppression coefficient minimum value at the time of the low SNR is guaranteed, and the continuity from the just-before sound section in which a lot of the not-deleted noise still survives is maintained. The control is taken in the high SNR so that the suppression coefficient minimum value is made small, and the residual noise is made small. The reason is that the continuity is maintained also when the residual noise of the non-sound section is small because the residual noise of the sound section is negligibly small. Further, setting $f_s$ so that it is larger than $A(\xi_n^L(k))$ allows a level of the noise suppression to be alleviated in the case of the sound section, or in the case that a possibility that the section is a sound section is high, thereby enabling a distortion occurring in the sound to be reduced. This is effective in the case that the precision at which the noise is estimated cannot raised sufficiently, for example, in the case of the sound in which a distortion caused by coding/decoding has been mixed, or the like.

Figure 30:
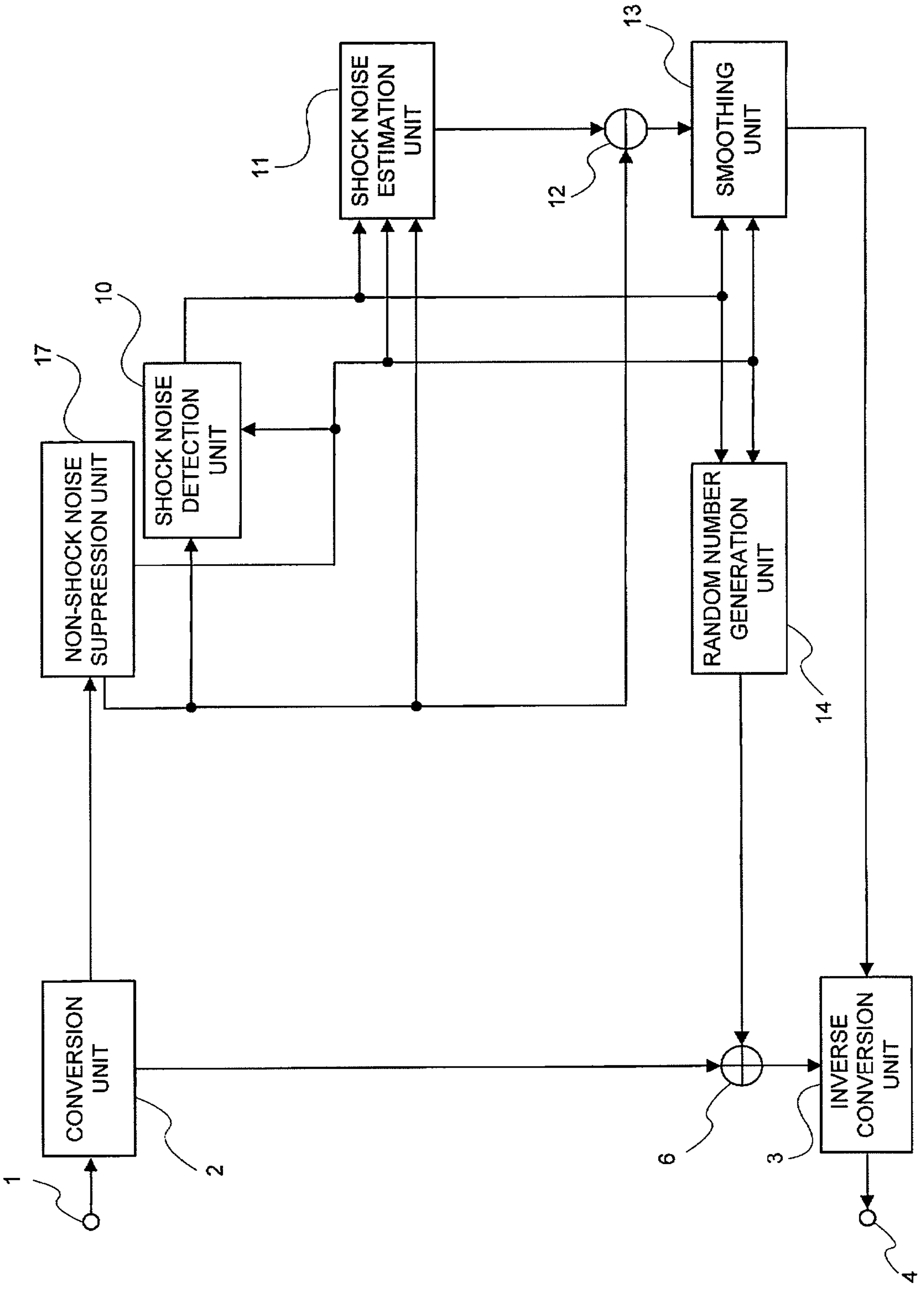
FIG. 30 is a block diagram illustrating an eighth embodiment of the present invention.

FIG. 30 is a block diagram illustrating an eighth embodiment of the present invention. A point in which FIG. 30 differs from FIG. 15, being the seventh embodiment, is that the non-shock noise suppression unit 7 has been replaced with a non-shock noise suppression unit 17, and the sound detection unit 9 has been deleted. In the eighth embodiment, the non-shock noise suppression unit 17 detects the sound instead of the sound detection unit 9.

Figure 31:
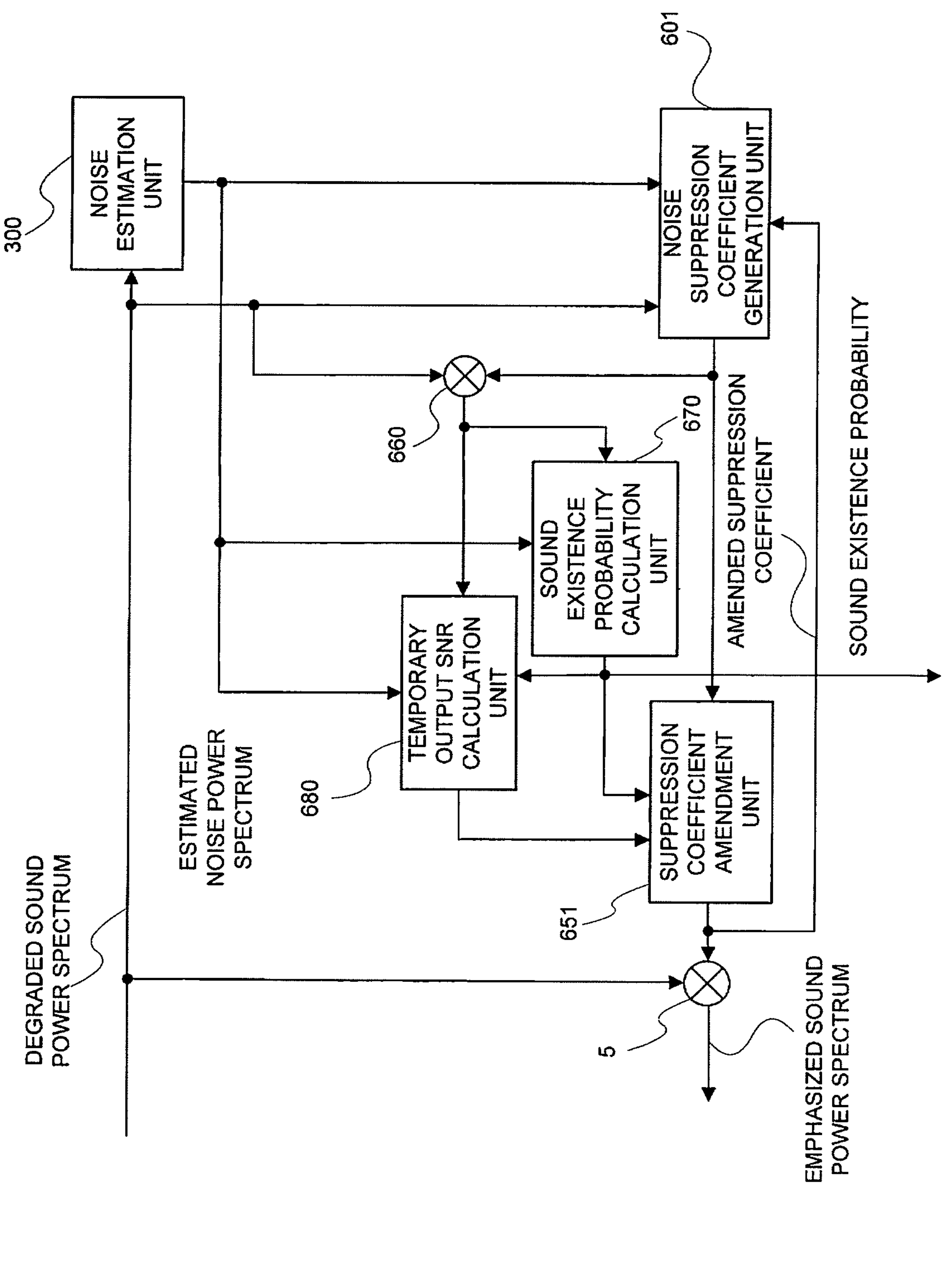
FIG. 31 is a block diagram illustrating a configuration of the non-shock noise suppression unit being included in FIG. 30.

FIG. 31 is a block diagram illustrating a configuration example of the non-shock noise suppression unit 17 being included in FIG. 30. A point in which FIG. 31 differs from FIG. 27, being the configuration example of the non-shock noise suppression unit 7, is that the sound existence probability calculated by the sound existence probability calculation unit 670 is supplied to the outside. This sound existence probability is supplied to the shock noise detection unit 10, the shock noise estimation unit 11, the smoothing unit 13, and the random number generation unit 14 of FIG. 30, and is used instead of the output of the sound detection unit 9.

Figure 32:
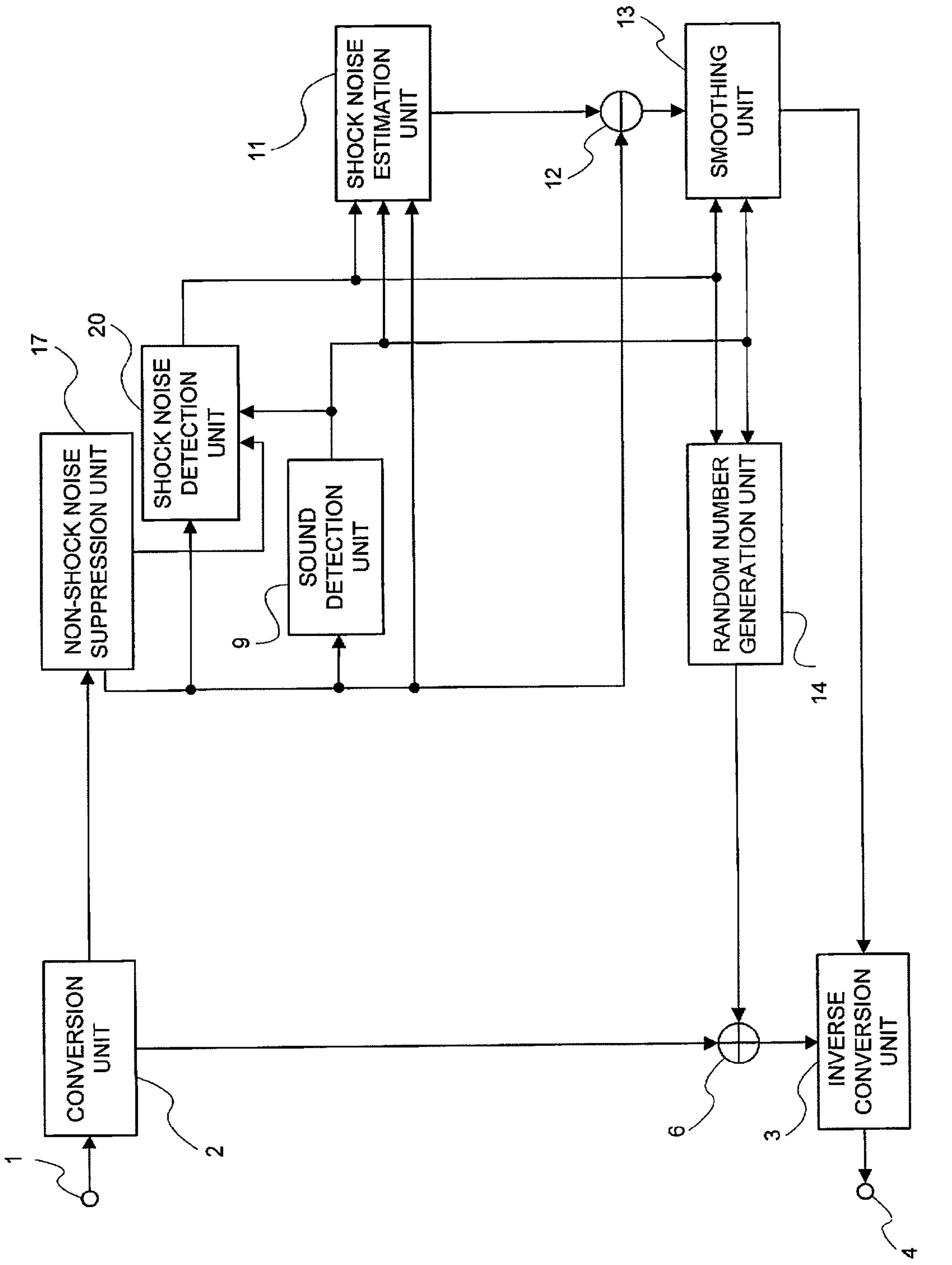
FIG. 32 is a block diagram illustrating a ninth embodiment of the present invention.

FIG. 32 is a block diagram illustrating a ninth embodiment of the present invention. A point in which FIG. 32 differs from FIG. 30, being the eighth embodiment, is that it includes a sound detection unit 9 besides a non-shock noise suppression unit 17, and the shock noise detection unit 10 has been replaced with a shock noise detection unit 20. The sound existence probability obtained by the non-shock noise suppression unit 17 and sound existence probability obtained by the sound detection unit 9 are supplied to the shock noise detection unit 20. The shock noise detection unit 20 gains a sound detection result with a higher precision by combining the sound existence probability obtained by the non-shock noise suppression unit 17 and the sound existence probability obtained by the sound detection unit 9.

Additionally, in the embodiment so far, an example of independently calculating the suppression coefficient for each frequency component, and performing the noise suppression by employing it was explained according to the Patent document 1. However, as disclosed in the Non-patent document 1, so as to curtail the arithmetic quantity, it is also possible to calculate the suppression coefficient common to a plurality of the frequency components, and to perform the noise suppression by employing it. This case requires a configuration of installing a band integration unit just in the upstream side of the conversion unit 2 in FIG. 1, FIG. 6, FIG. 9, FIG. 12 to FIG. 15, and FIG. 30. Further, the conversion unit 2 and the inverse conversion unit 3 can be realized with a filter bank forming a pair. While the filter bank causes an arithmetic scale to augment, and a frequency resolution to decline, it has an effect of shortening a delay and reducing an aliasing distortion. In addition, the multiplication type suppression technique shown in the sixth embodiment is applicable to the first embodiment to the fifth embodiments, the seventh embodiment, and the eighth embodiment as well.

In addition hereto, as described in the Non-patent document 1, installing an offset deletion unit in the downstream side of the conversion unit 2 of FIG. 1, and an amplitude amendment unit and a phase amendment unit just in the upstream side of the conversion unit 2 makes it possible to form a high-band passage filter as well in the frequency region, and to curtail the arithmetic quantity. Further, the noise estimation value can be also amended responding to a specific frequency band at the moment of calculating the suppression coefficient common to a plurality of the frequency components.

Figure 33:
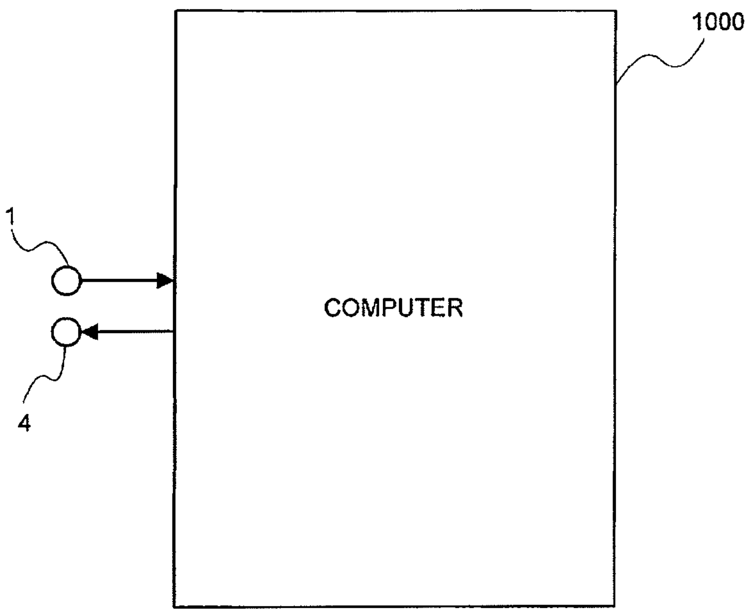
FIG. 33 is a block diagram illustrating a noise suppression device based upon a tenth embodiment of the present invention.

FIG. 33 is a block diagram of the noise suppression device based upon the tenth embodiment of the present invention. The tenth embodiment of the present invention is configured of a computer (central processing unit; processor; data processing device) 1000 that operates under control of a program, an input terminal 1, and an output terminal 4. The computer 1000 includes a conversion unit 2, an inverse conversion unit 3, a shock noise detection unit 8 or 10, and a shock noise suppression unit 19. It may include a sound detection unit 9, and may include a shock noise estimation unit 11 and a subtracter 12 instead of the shock noise suppression unit 19. In addition, it can also include a smoothing unit 13 for smoothing the output signal, and a random number generation unit 14 for changing the phase at random. It is also possible to include a suppression coefficient calculation unit 15 and a multiplier 16 instead of the shock noise estimation unit 11 and the subtracter 12. Including a non-shock noise suppression unit 7 or 17 just in the upstream side of the conversion unit enables the non-shock noise as well to be suppressed.

The degraded sound supplied to the input terminal 1, which is subjected to the transformation such as a Fourier transform in the conversion unit 2, is divided into a plurality of the frequency components, and is supplied to the non-shock noise suppression unit 7. The phase, to which the random number generated by the random number generation unit 14 has been added in the adder 6, is conveyed to the inverse conversion unit 3. The non-shock noise suppression unit 7 suppresses the non-shock noise being superposed upon the desired signal, and supplies the emphasized sound to the sound detection unit 9, the shock noise detection unit 10, the shock noise estimation unit 11, and the subtracter 12. The sound detection unit 9 detects the sound, and conveys the sound existence probability to the shock noise detection unit 10, the smoothing unit 13, and the random number generation unit 14. The shock noise detection unit 10 detects the shock noise based upon a change in the degraded sound power spectrum, and conveys the shock noise existence probability to the shock noise estimation unit 11. The shock noise estimation unit 11, upon receipt of the shock noise existence probability, the sound existence probability, and the degraded sound power spectrum, estimates the shock noise, and conveys it to the subtracter 12. The subtracter 12 suppresses the shock noise by subtracting the estimated value of the shock noise from the degraded sound power spectrum, and conveys the shock noise suppression signal to the smoothing unit 13. The smoothing unit 13 smoothes the shock noise suppression signal, and conveys it to the inverse conversion unit 3. The inverse conversion unit 3 inverse-converts the power spectrum of the shock noise suppression sound supplied from the smoothing unit 13, and the phase of the degraded sound supplied from the conversion unit 2 via the adder 6 in all, and conveys it as an emphasized sound signal sample to the output terminal 4.

In the present invention, performing the operation in such a configuration makes it possible to suppress the shock noise without using the shock noise occurrence information, and to output the emphasized sound with a high sound quality.

While all of the configuration examples of the no-shock noise suppression units were explained so far on the assumption that the minimum mean square error short-time spectrum amplitude technique was employed as a technique of suppressing the noise, the other methods as well are applicable. As an example of such a method, there exist the Wiener filtering method disclosed in Non-patent document 5 (Non-patent document 5: PROCEEDING OF THE IEEE, Vol. 67. No. 12, pp. 1586 to 1604, December, 1979), the spectrum subtraction method disclosed in Non-patent document 6 (Non-patent document 6: IEEE TRANSACTIONS ON ACOUSTICS, SPEECH, AND SIGNAL PROCESSING, Vol. 27. No. 2, pp. 113 to 120, April, 1979), or the like, and explanation of these detailed configuration examples is omitted.

The above-mentioned present invention is a noise suppression method comprising: converting an input signal into a frequency region signal; obtaining information as to whether or not shock noise exists by employing a changed quantity of the above frequency region signal; and suppressing the shock noise by employing the above information as to whether or not the shock noise exists and said frequency region signal.

Also, the above-mentioned present invention further comprises obtaining the information as to whether or not the shock noise exists by employing a flatness degree of said frequency region signal.

Also, the above-mentioned present invention further comprises: obtaining information as to whether or not a first sound exists by employing said frequency region signal; and obtaining said information as to whether or not the shock noise exists by employing the above information as to whether or not the first sound exists.

Also, the above-mentioned present invention further comprises: obtaining information as to whether or not the first sound exists by employing said frequency region signal; obtaining said information as to whether or not the shock noise exists by employing the above information as to whether or not the first sound exists; obtaining an estimated value of the shock noise by employing the above information as to whether or not the shock noise exists, said information as to whether or not the first sound exists, and said frequency region signal; and suppressing the shock noise by subtracting the above estimated value of the shock noise from said frequency region signal.

Also, the above-mentioned present invention further comprises: obtaining information as to whether or not the first sound exists by employing said frequency region signal; obtaining said information as to whether or not the shock noise exists by employing the above information as to whether or not the first sound exists; obtaining an estimated value of the shock noise by employing the above information as to whether or not the shock noise exists, said information as to whether or not the first sound exists, and said frequency region signal; obtaining a suppression coefficient by employing the above estimated value of the shock noise, and said frequency region signal; and suppressing the shock noise by obtaining a product of the above suppression coefficient and said frequency region signal.

Also, the above-mentioned present invention further comprises smoothing said signal of which the shock noise has been suppressed.

Also, the above-mentioned present invention further comprises: generating a random number within a pre-decided range; obtaining an amended phase by adding the above random number to a phase of said frequency region signal; and combining the above amended phase and said signal of which the shock noise has been suppressed, thereby to convert it into a time region signal.

Also, the above-mentioned present invention further comprises: obtaining a non-shock noise suppression signal by suppressing non-shock noise for said frequency region signal; and using the above non-shock noise suppression signal instead of said frequency region signal.

Also, the above-mentioned present invention further comprises: obtaining a non-shock noise suppression signal by suppressing non-shock noise for said frequency region signal; obtaining information as to whether or not a second sound exists by employing the above non-shock noise suppression signal; and obtaining an estimated value of the shock noise by employing the above information as to whether or not the second sound exists, said information as to whether or not the shock noise exists, said information as to whether or not the first sound exists, and said frequency region signal.

The present invention is a noise suppression device, comprising: a conversion unit for converting an input signal into a frequency region signal; a shock noise detection unit for obtaining information as to whether or not shock noise exists by employing a changed quantity of the above frequency region signal; and a shock noise suppression unit for suppressing the shock noise by employing the above information as to whether or not the shock noise exists and said frequency region signal.

Also, the above-mentioned present invention further comprises a shock noise detection unit for obtaining the information as to whether or not the shock noise exists by employing the changed quantity and a flatness degree of said frequency region signal.

Also, the above-mentioned present invention further comprises: a sound detection unit for obtaining information as to whether or not a first sound exists by employing said frequency region signal; and a shock noise detection unit for obtaining the information as to whether or not the shock noise exists by employing the above information as to whether or not the first sound exists.

Also, the above-mentioned present invention further comprises: a sound detection unit for obtaining information as to whether or not the first sound exists by employing said frequency region signal; a shock noise detection unit for obtaining the information as to whether or not the shock noise exists by employing the above information as to whether or not the first sound exists; a shock noise estimation unit for obtaining an estimated value of the shock noise by employing the above information as to whether or not the shock noise exists, said information as to whether or not the first sound exists, and said frequency region signal; and a subtracter for subtracting the above estimated value of the shock noise from said frequency region signal.

Also, the above-mentioned present invention further comprises: a sound detection unit for obtaining information as to whether or not the first sound exists by employing said frequency region signal; a shock noise detection unit for obtaining the information as to whether or not the shock noise exists by employing the above information as to whether or not the first sound exists; a shock noise estimation unit for obtaining an estimated value of the shock noise by employing the above information as to whether or not the shock noise exists, said information as to whether or not the first sound exists, and said frequency region signal; a suppression coefficient calculation unit for obtaining a suppression coefficient by employing the above estimated value of the shock noise, and said frequency region signal; and a multiplier for suppressing the shock noise by obtaining a product of the above suppression coefficient and said frequency region signal.

Also, the above-mentioned present invention further comprises a smoothing unit for further smoothing said signal of which the shock noise has been suppressed.

Also, the above-mentioned present invention further comprises: a random number generation unit for generating a random number within a pre-decided range; an adder for obtaining an amended phase by adding the above random number to a phase of said frequency region signal; and an inverse conversion unit for combining the above amended phase and said signal of which the shock noise has been suppressed, thereby to convert it into a time region signal.

Also, the above-mentioned present invention further comprises a non-shock noise suppression unit for obtaining a non-shock noise suppression signal by suppressing non-shock noise for said frequency region signal, said noise suppression device using the above non-shock noise suppression signal instead of said frequency region signal.

Also, the above-mentioned present invention further comprises: a non-shock noise suppression unit for obtaining a non-shock noise suppression signal by suppressing non-shock noise for said frequency region signal, and simultaneously therewith, obtaining information as to whether or not a second sound exists, wherein said shock noise estimation unit obtains an estimated value of the shock noise by employing said information as to whether or not the second sound exists, said information as to whether or not the shock noise exists, said information as to whether or not the first sound exists, and said frequency region signal.

The present invention is a noise suppression program causing a computer to execute the processes of: converting an input signal into a frequency region signal; obtaining information as to whether or not sound exists by employing the above frequency region signal: obtaining information as to whether or not shock noise exists by employing the above information as to whether or not the sound exists, and a changed quantity and a flatness degree of said frequency region signal; obtaining an estimated value of the shock noise by employing said information as to whether or not the sound exists, said information as to whether or not the shock noise exists, and said frequency region signal; and suppressing the shock noise by employing the above estimated value of the shock noise and said frequency region signal, thereby to generate an emphasized sound.

Also, the above-mentioned present invention further causes the computer to further execute a process of smoothing said emphasized sound.

Also, the above-mentioned present invention further causes the computer to further execute the processes of: generating a random number within a pre-decided range; obtaining an amended phase by adding the above random number to a phase of said frequency region signal; and combining the above amended phase and said signal of which the shock noise has been suppressed, thereby to convert it into a time region signal.

Also, the above-mentioned present invention further causes the computer to further execute the processes of: converting an input signal into a frequency region signal; obtaining information as to whether or not the sound exists by employing the above frequency region signal; obtaining information as to whether or not the shock noise exists by employing the above information as to whether or not the sound exists, and a changed quantity and a flatness degree of said frequency region signal; obtaining an estimated value of the shock noise by employing said information as to whether or not the sound exists, said information as to whether or not the shock noise exists, and said frequency region signal; and suppressing the shock noise by subtracting the above estimated value of the shock noise from said frequency region signal.

The present application claims priority based on Japanese Patent Application No. 2007-55149 filed on Mar. 6, 2007, disclosure of which is incorporated herein in its entirety.

The invention claimed is:

1. A noise suppression method, comprising:

converting an input signal including a desired signal and noise into a frequency region signal;

obtaining information as to whether or not shock noise exists by employing a flatness degree of the above frequency region signal and a changed quantity of the above frequency region signal in a high frequency range; and suppressing the shock noise by employing the above information as to whether or not the shock noise exists and said frequency region signal.

2. The noise suppression method according to claim 1, further comprising:

obtaining information as to whether or not a first sound exists by employing said frequency region signal; and obtaining said information as to whether or not the shock noise exists by employing the above information as to whether or not the first sound exists, and the changed quantity and the flatness degree of said frequency region signal.

3. The noise suppression method according to claim 1, further comprising:

obtaining information as to whether or not the first sound exists by employing said frequency region signal;

obtaining said information as to whether or not the shock noise exists by employing the above information as to whether or not the first sound exists, and the changed quantity and the flatness degree of said frequency region signal;

obtaining an estimated value of the shock noise by employing said information as to whether or not the shock noise exists, said information as to whether or not the first sound exists, and said frequency region signal; and suppressing the shock noise by subtracting said estimated value of the shock noise from said frequency region signal.

4. The noise suppression method according to claim 1, further comprising:

obtaining information as to whether or not the first sound exists by employing said frequency region signal;

obtaining said information as to whether or not the shock noise exists by employing the above information as to whether or not the first sound exists, and the changed quantity and the flatness degree of said frequency region signal;

obtaining an estimated value of the shock noise by employing said information as to whether or not the shock noise exists, said information as to whether or not the first sound exists, and said frequency region signal;

obtaining a suppression coefficient by employing the above estimated value of the shock noise, and said frequency region signal; and suppressing the shock noise by obtaining a product of the above suppression coefficient and said frequency region signal.

5. The noise suppression method according to claim 1, comprising smoothing said signal of which the shock noise has been suppressed further.

6. The noise suppression method according to claim 1, further comprising:

generating a random number within a pre-decided range;

obtaining an amended phase by adding the above random number to a phase of said frequency region signal; and combining the above amended phase and said signal of which the shock noise has been suppressed, thereby to convert it into a time region signal.

7. The noise suppression method according to claim 1, further comprising:

obtaining a non-shock noise suppression signal by suppressing non-shock noise for said frequency region signal; and using the above non-shock noise suppression signal instead of said frequency region signal.

8. The noise suppression method according to claim 1, further comprising:

obtaining a non-shock noise suppression signal by suppressing non-shock noise for said frequency region signal;

obtaining information as to whether or not a second sound exists by employing the above non-shock noise suppression signal; and obtaining an estimated value of the shock noise by employing the above information as to whether or not the second sound exists, said information as to whether or not the shock noise exists, said information as to whether or not the first sound exists, and said frequency region signal.

9. A noise suppression device, comprising:

a converter for converting an input signal including a desired signal and noise into a frequency region signal;

a shock noise detector for obtaining information as to whether or not shock noise exists by employing a flatness degree of the above frequency region signal and a changed quantity of the above frequency region signal in a high frequency range; and a shock suppressor for suppressing the shock noise by employing the above information as to whether or not the shock noise exists and said frequency region signal.

10. The noise suppression device according to claim 9, further comprising:

a sound detector for obtaining information as to whether or not a first sound exists by employing said frequency region signal, wherein said shock noise detector obtains the information as to whether or not the shock noise exists by employing said information as to whether or not the first sound exists, and the changed quantity and the flatness degree of said frequency region signal.

11. The noise suppression device according to claim 9, further comprising a sound detector for obtaining information as to whether or not the first sound exists by employing said frequency region signal, wherein said shock noise detector comprises;

a shock noise estimation unit for obtaining said information as to whether or not the shock noise exists by employing the above information as to whether or not the first sound exists, and the changed quantity and the flatness degree of said frequency region signal obtaining an estimated value of the shock noise by employing said above information as to whether or not the shock noise exists, said information as to whether or not the first sound exists, and said frequency region signal; and a subtracter for subtracting said estimated value of the shock noise from said frequency region signal.

12. The noise suppression device according to claim 9, further comprising a sound detector for obtaining information as to whether or not the first sound exists by employing said frequency region signal, wherein said shock noise detector comprises;

a shock noise estimation unit for obtaining said information as to whether or not the shock noise exists by employing the above information as to whether or not the first sound exists, and the changed quantity and the flatness degree of said frequency region signal, and obtaining an estimated value of the shock noise by employing said information as to whether or not the shock noise exists, said information as to whether or not the first sound exists, and said frequency region signal;

a suppression coefficient calculation unit for obtaining a suppression coefficient by employing the above estimated value of the shock noise, and said frequency region signal; and a multiplier for suppressing the shock noise by obtaining a product of the above suppression coefficient and said frequency region signal.

13. The noise suppression device according to claim 9, comprising a smoothing unit for further smoothing said signal of which the shock noise has been suppressed.

14. The noise suppression device according to claim 9, further comprising:

a random number generation unit for generating a random number within a pre-decided range; an adder for obtaining an amended phase by adding the above random number to a phase of said frequency region signal; and an inverse converter for combining the above amended phase and said signal of which the shock noise has been suppressed, thereby to convert it into a time region signal.

15. The noise suppression device according to claim 9, further comprising a non-shock noise suppressor for obtaining a non-shock noise suppression signal by suppressing non-shock noise for said frequency region signal, said noise suppression device using the above non-shock noise suppression signal instead of said frequency region signal.

16. The noise suppression device according to claim 9, further comprising a non-shock noise suppressor for obtaining a non-shock noise suppression signal by suppressing non-shock noise for said frequency region signal, and simultaneously therewith, obtaining information as to whether or not a second sound exists, wherein said shock noise estimator obtains an estimated value of the shock noise by employing said information as to whether or not the second sound exists, said information as to whether or not the shock noise exists, said information as to whether or not the first sound exists, and said frequency region signal.

17. A non-transitory computer readable storage medium storing a noise suppression program causing a computer to execute the processes of:

converting an input signal including a desired signal and noise into a frequency region signal;

obtaining information as to whether or not sound exists by employing said frequency region signal:

obtaining information as to whether or not shock noise exists by employing the above information as to whether or not the sound exists, and a changed quantity of said frequency region signal in a high frequency range;

obtaining an estimated value of the shock noise by employing said information as to whether or not the sound exists, said information as to whether or not the shock noise exists, and said frequency region signal; and suppressing the shock noise by employing the above estimated value of the shock noise and said frequency region signal, thereby generating an emphasized sound.

18. The non-transitory computer readable storage medium storing a noise suppression program according to claim 17, causing the computer to further execute a process of smoothing said emphasized sound.

19. The non-transitory computer readable storage medium storing a noise suppression program according to claim 17, causing the computer to further execute the processes of:

generating a random number within a pre-decided range;

obtaining an amended phase by adding the above random number to a phase of said frequency region signal; and combining the above amended phase and said signal of which the shock noise has been suppressed, thereby to convert it into a time region signal.

20. The non-transitory computer readable storage medium storing a noise suppression program according to claim 17, causing the computer to further execute the processes of:

converting an input signal into a frequency region signal;

obtaining information as to whether or not the sound exists by employing said frequency region signal;

obtaining information as to whether or not the shock noise exists by employing the above information as to whether or not the sound exists, and a changed quantity and a flatness degree of said frequency region signal;

obtaining an estimated value of the shock noise by employing said information as to whether or not the sound exists, said information as to whether or not the shock noise exists, and said frequency region signal; and suppressing the shock noise by subtracting said estimated value of the shock noise from said frequency region signal.

* * * * *